(12) United States Patent
Plut

(10) Patent No.: US 7,156,522 B2
(45) Date of Patent: Jan. 2, 2007

(54) PROJECTION-TYPE DISPLAY DEVICES WITH REDUCED WEIGHT AND SIZE

(76) Inventor: William J. Plut, 2232 N. Point St., #3, San Francisco, CA (US) 94123

( * ) Notice: Subject to any disclaimer, the term of this patent is extended or adjusted under 35 U.S.C. 154(b) by 191 days.

(21) Appl. No.: 10/891,692

(22) Filed: Jul. 14, 2004

(65) Prior Publication Data

US 2005/0041000 A1   Feb. 24, 2005

Related U.S. Application Data

(60) Provisional application No. 60/487,692, filed on Jul. 16, 2003, provisional application No. 60/487,866, filed on Jul. 16, 2003, provisional application No. 60/487,753, filed on Jul. 16, 2003, provisional application No. 60/487,867, filed on Jul. 16, 2003.

(51) Int. Cl.
*G03B 21/14* (2006.01)

(52) U.S. Cl. .......................................... 353/31; 353/94

(58) Field of Classification Search .................. 353/31, 353/33, 34, 37, 122, 94; 349/5, 7, 8, 9; 362/553, 554, 555, 559, 561
See application file for complete search history.

(56) References Cited

U.S. PATENT DOCUMENTS

| | | | |
|---|---|---|---|
| 4,969,733 A | 11/1990 | Jewison | |
| 4,978,218 A | 12/1990 | Carpenter | |
| 5,098,184 A | 3/1992 | van den Brandt | |
| 5,136,675 A | 8/1992 | Hodson | |
| 5,170,196 A | 12/1992 | Itoh | |
| 5,287,132 A | 2/1994 | Suzuki | |
| 5,343,489 A | 8/1994 | Wangler | |
| 5,347,324 A | 9/1994 | Sasaki | |
| 5,394,264 A | 2/1995 | Cheng | |
| 5,416,541 A | 5/1995 | Fog | |
| 5,418,583 A | 5/1995 | Masumoto | |
| 5,515,391 A | 5/1996 | Endriz | |
| 5,534,950 A | 7/1996 | Hargis | |
| 5,612,968 A | 3/1997 | Zah | |
| 5,624,173 A | 4/1997 | Davidson | |
| 5,651,599 A | 7/1997 | Fujimori | |
| 5,654,776 A | 8/1997 | Furuya | |
| 5,668,595 A | 9/1997 | Katayama | |
| 5,700,076 A * | 12/1997 | Minich et al. | 353/31 |
| 5,782,548 A | 7/1998 | Miyashita | |
| 5,818,639 A | 10/1998 | Furuya | |
| 5,851,060 A | 12/1998 | Uchiyama | |
| 5,927,985 A | 7/1999 | Lechner | |
| 5,959,702 A | 9/1999 | Goodman | |
| 5,959,778 A | 9/1999 | Shimonura | |
| 5,971,545 A * | 10/1999 | Haitz | 353/31 |
| 5,990,983 A | 11/1999 | Hargis | |
| 6,075,504 A | 6/2000 | Stoller | |
| 6,089,717 A | 7/2000 | Iwai | |
| 6,137,638 A | 10/2000 | Yamagishi | |
| 6,155,687 A | 12/2000 | Peterson | |

(Continued)

*Primary Examiner*—William C. Dowling

(57) ABSTRACT

Described herein are display devices that provide projection-type video output and use diode lasers to generate light. For example, one set of diode lasers may produce red light, while a second set produces blue light. Optics are employed to expand laser light from its small generated or transmitted flux area to a size suitable for transmission onto the optical modulation device. Another aspect of the invention relates to a redundant laser set to generate light. A redundant laser set includes more lasers than that needed to produce the desired amount of light.

19 Claims, 9 Drawing Sheets

U.S. PATENT DOCUMENTS

| | | |
|---|---|---|
| 6,170,953 B1 | 1/2001 | Lee |
| 6,179,426 B1 | 1/2001 | Rodriguez, Jr. et al. |
| 6,183,092 B1 | 2/2001 | Troyer |
| 6,185,047 B1 | 2/2001 | Peterson |
| 6,191,826 B1 | 2/2001 | Murakami |
| 6,224,216 B1 * | 5/2001 | Parker et al. ............ 353/31 |
| 6,246,446 B1 | 6/2001 | Heimbuch |
| 6,317,170 B1 | 11/2001 | Hwang |
| 6,323,984 B1 | 11/2001 | Trisnadi |
| 6,350,033 B1 | 2/2002 | Fujimori |
| 6,367,935 B1 | 4/2002 | Wang |
| 6,373,646 B1 | 4/2002 | Timmermans |
| 6,392,821 B1 | 5/2002 | Benner, Jr. |
| 6,394,606 B1 | 5/2002 | Miyawaki |
| 6,416,184 B1 | 7/2002 | Arai |
| 6,426,781 B1 | 7/2002 | Lee |
| 6,426,836 B1 | 7/2002 | Dorsel |
| 6,435,682 B1 | 8/2002 | Kaelin |
| 6,445,487 B1 | 9/2002 | Roddy |
| 6,454,417 B1 | 9/2002 | Takamoto |
| 6,471,366 B1 | 10/2002 | Gohman |
| 6,472,828 B1 | 10/2002 | Pruett |
| 6,480,634 B1 | 11/2002 | Corrigan |
| 6,481,852 B1 | 11/2002 | Osaka |
| 6,481,855 B1 | 11/2002 | Oehler |
| 6,488,380 B1 | 12/2002 | Fujimori |
| 6,490,011 B1 | 12/2002 | Cooper |
| 6,491,398 B1 | 12/2002 | Takeuchi |
| 6,501,866 B1 | 12/2002 | Thomas |
| 6,594,090 B1 | 7/2003 | Kruschwitz |
| 6,600,590 B1 | 7/2003 | Roddy |
| 6,604,829 B1 | 8/2003 | Rodriguez, Jr. |
| 6,625,381 B1 | 9/2003 | Roddy |
| 6,636,339 B1 | 10/2003 | Lee |
| 6,665,478 B1 | 12/2003 | Shen |
| 6,709,114 B1 | 3/2004 | Duggan |
| 6,728,274 B1 | 4/2004 | Sousa |
| 6,736,517 B1 | 5/2004 | Sherman |
| 6,747,781 B1 | 6/2004 | Trisnadi |
| 6,764,107 B1 | 7/2004 | Obahi |
| 6,769,772 B1 * | 8/2004 | Roddy et al. ............ 353/31 |
| 6,771,326 B1 | 8/2004 | Flint |
| 6,790,205 B1 | 9/2004 | Yamazaki |
| 6,801,299 B1 | 10/2004 | Kremer |
| 6,807,010 B1 | 10/2004 | Kowarz |
| 6,817,632 B1 | 11/2004 | You |
| 6,821,026 B1 | 11/2004 | Devine |
| 6,863,402 B1 * | 3/2005 | Roddy et al. ............ 353/31 |
| 6,864,861 B1 * | 3/2005 | Scherer et al. ........... 345/7 |
| 6,947,459 B1 * | 9/2005 | Kurtz et al. ............ 372/43.01 |
| 2002/0126479 A1 * | 9/2002 | Zhai et al. ............ 362/244 |
| 2004/0135874 A1 * | 7/2004 | Oehlbeck et al. ........ 347/232 |
| 2005/0147135 A1 * | 7/2005 | Kurtz et al. ............ 372/23 |

\* cited by examiner

PROJECTION-TYPE DISPLAY DEVICES WITH REDUCED WEIGHT AND SIZE

CROSS-REFERENCE TO RELATED APPLICATION

This patent application claims priority under 35 U.S.C. §119(e) from co-pending U.S. Provisional Patent Application No. 60/487,692 filed Jul. 16, 2003, which is incorporated by reference herein for all purposes; this application also claims priority under 35 U.S.C. §119(e) from co-pending U.S. Provisional Patent Application No. 60/487,866 filed Jul. 16, 2003, which is incorporated by reference herein for all purposes; this application also claims priority under 35 U.S.C. §119(e) from co-pending U.S. Provisional Patent Application No. 60/487,753 filed Jul. 16, 2003, which is incorporated by reference herein for all purposes; and this application also claims priority under 35 U.S.C. §19(e) from co-pending U.S. Provisional Patent Application No. 60/487,867 filed Jul. 16, 2003, which is incorporated by reference herein for all purposes.

BACKGROUND OF THE INVENTION

This invention relates to display devices that project an image. More particularly, the present invention relates to projection-type display devices that employ lasers for light generation.

DVD players, VCRs and computer systems such as desktop computers, laptop computers, and video game consoles use a display device to output video information. A number of display technologies are currently available, with cathode ray tube (CRT) monitors and liquid crystal display (LCD) screens being most popular.

Projection-type display devices—or 'projectors'—that cast an image onto a receiving surface are a relatively new display technology, increasing in popularity, and offer image sizes having diagonal spans up to 30 feet. Market concerns for projectors include portability and longevity.

Conventional projectors employ a lamp, such as a metal halide lamp, to generate white light. One problem with a white-light emitting lamp is lifetime. Not only does a lamp burn out after about two thousand hours, but luminous power consistency often declines with lamp age. The high price of currently available projectors—and the cost of replacement lamps—compromises market acceptance and projector sales.

Based on the foregoing, it should be apparent that alternative light generation options for projection-type display devices would be desirable.

SUMMARY OF THE INVENTION

The present invention relates to display devices that provide projection-type video output and use diode lasers to generate light. For example, one set of diode lasers may produce red light, while a second set produces blue light. One or more lenses may be employed to reduce divergence in the laser light generated by each diode laser. Optics are employed to expand laser light from its small generated or transmitted flux area to a size suitable for transmission onto an optical modulation device.

In one aspect, the present invention relates to a projection-type display device. The display device comprises a first diode laser set. Each diode laser in the first diode laser set includes a) a lasing medium in a lasing chamber for producing first light including a first wavelength between about 400 nanometers and about 700 nanometers, and b) an output lens for emitting the first light. The display device also comprises a second diode laser set. Each diode laser in the second diode laser set includes a) a lasing medium in a lasing chamber for producing second light including a second wavelength between about 400 nanometers and about 700 nanometers, and b) an output lens for emitting the second light. The display device further comprises at least one optical modulation device configured to selectively transmit the first light and the second light according to video data included in a video signal provided to the at least one optical modulation device. The display device additionally comprises an optics system, arranged to receive the first light and the second light before receipt by the at least one optical modulation device, configured to increase flux area for the first light and the second light before receipt by the at least one optical modulation device. The display device also comprises a projection lens system configured to project light transmitted by the at least one optical modulation device along a projection path.

In another aspect, the present invention relates to a projection-type display device. The display device comprises a red diode laser set. Each red diode laser in the red diode laser set includes a) a lasing medium in a lasing chamber for producing light including a red wavelength between about 615 nanometers and about 690 nanometers, and b) an output lens for emitting the red light. The display device also comprises a blue diode laser set. Each blue diode laser in the blue diode laser set includes a) a lasing medium in a lasing chamber for producing light including a blue wavelength between about 420 nanometers and about 500 nanometers, and b) an output lens for emitting the blue light. The display device further comprises at least one optical modulation, an optics system configured to increase flux area for the light, and a projection lens system configured to project light along a projection path.

In another aspect, the present invention relates to a projection-type display device. The display device comprises a red diode laser set. Each red diode laser in the red diode laser set including a) a lasing medium in a lasing chamber for producing light including a red wavelength between about 615 nanometers and about 690 nanometers, and b) an output lens for emitting the red light. The display device also comprises a blue diode laser set. Each blue diode laser in the blue diode laser set including a) a lasing medium in a lasing chamber for producing light including a blue wavelength between about 420 nanometers and about 500 nanometers, and b) an output lens for emitting the blue light. The display device also comprises a third set of lasers, each laser in the third laser set including a) a lasing medium and lasing chamber for producing third light including a third wavelength between about 510 nanometers and about 570 nanometers, and b) an output lens for emitting the third light. The display device further comprises at least one optical modulation, an optics system configured to increase flux area for the light, and a projection lens system configured to project light along a projection path.

Another aspect of the invention relates to a redundant laser set to generate light. The laser set produces a desired amount of light, e.g., for a primary color. A redundant laser set includes more lasers than that needed to produce the desired amount of light. For example, a set of six lasers may only need five lasers to generate and emit the desired amount of light. The sixth laser allows failure of one laser in the set to not compromise operability of the entire set—and the display device. In addition, extra lasers in a laser set also allow the lasers to be cycled for heat purposes and to extend longevity of individual lasers in the set.

In yet another aspect, the present invention relates to a projection-type display device. The display device comprises a laser set for producing a desired amount of light. The laser set includes a plurality of lasers. The total number of lasers in the laser set is greater than a number of lasers needed to produce the desired amount of light. Each laser in the laser set produces light in a wavelength range related to a primary color. The display device also comprises control circuitry that determines which of the lasers in the set produces light. The display device further comprises an optical modulation device for selectively transmitting light according to video data included in a video signal provided to the optical modulation device. The display device additionally comprises an optics system, arranged to receive light produced by the laser set before receipt by the optical modulation device, for increasing flux area of the light. The display device also comprises a projection lens system for projecting light transmitted by the optical modulation device along a projection path.

In a method aspect, the present invention relates to a method for producing light in a projection-type display device including a plurality of lasers. Each laser in the laser set produces light in a wavelength range related to a primary color. The method also comprises determining which of the lasers in the laser set will produce a desired amount of light. The method further comprises producing the desired amount of light using a number of lasers in the laser set that is less than the total number of lasers in the laser set.

In another method aspect, the present invention relates to a method for producing an image using a projection-type display device. The method comprises producing a desired amount of light using a number of lasers in a laser set that is less than the total number of lasers in the laser set. Each laser in the laser set produces light in a wavelength range related to a primary color. The method also comprises increasing flux area of the light before transmission to an optical modulation device. The method further comprises selectively transmitting light according to video data included in a video signal provided to the optical modulation device. The method additionally comprises outputting light transmitted by the optical modulation device along a projection path.

To reduce any speckle effects for a projected image cast by a projector onto of a non-specular surface, the present invention may decrease coherence of laser-generated light. In one embodiment, coherence reduction is accomplished by introducing a coherence diffuser in a light path of the laser light. Arranging the coherence diffuser in an unfocused light beam reduces both temporal and spatial coherence in the light. Arranging the rotating diffuser at the focus of a beam reduces only the temporal coherence while maintaining the spatial coherence.

In one aspect, the present invention relates to a projection-type display device. The display device comprises a set of lasers for producing light. The display device also comprises a coherence diffuser arranged to intercept light produced by the lasers and to reduce coherence in the light. The display device further comprises at least one optical modulation, an optics system configured to increase flux area for the light, and a projection lens system configured to project light along a projection path.

These and other features of the present invention will be presented in more detail in the following detailed description of the invention and the associated figures.

Before committing to the Detailed Description, it may facilitate understanding to clarify certain words and phrases used in this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, be proximate to, be bound to or with, have, have a property of, or the like. Support and definitions for certain words and phrases are provided throughout this patent document, and those of ordinary skill in the art should understand that in many, if not most instances, such support applies to prior, as well as future uses of such words and phrases.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
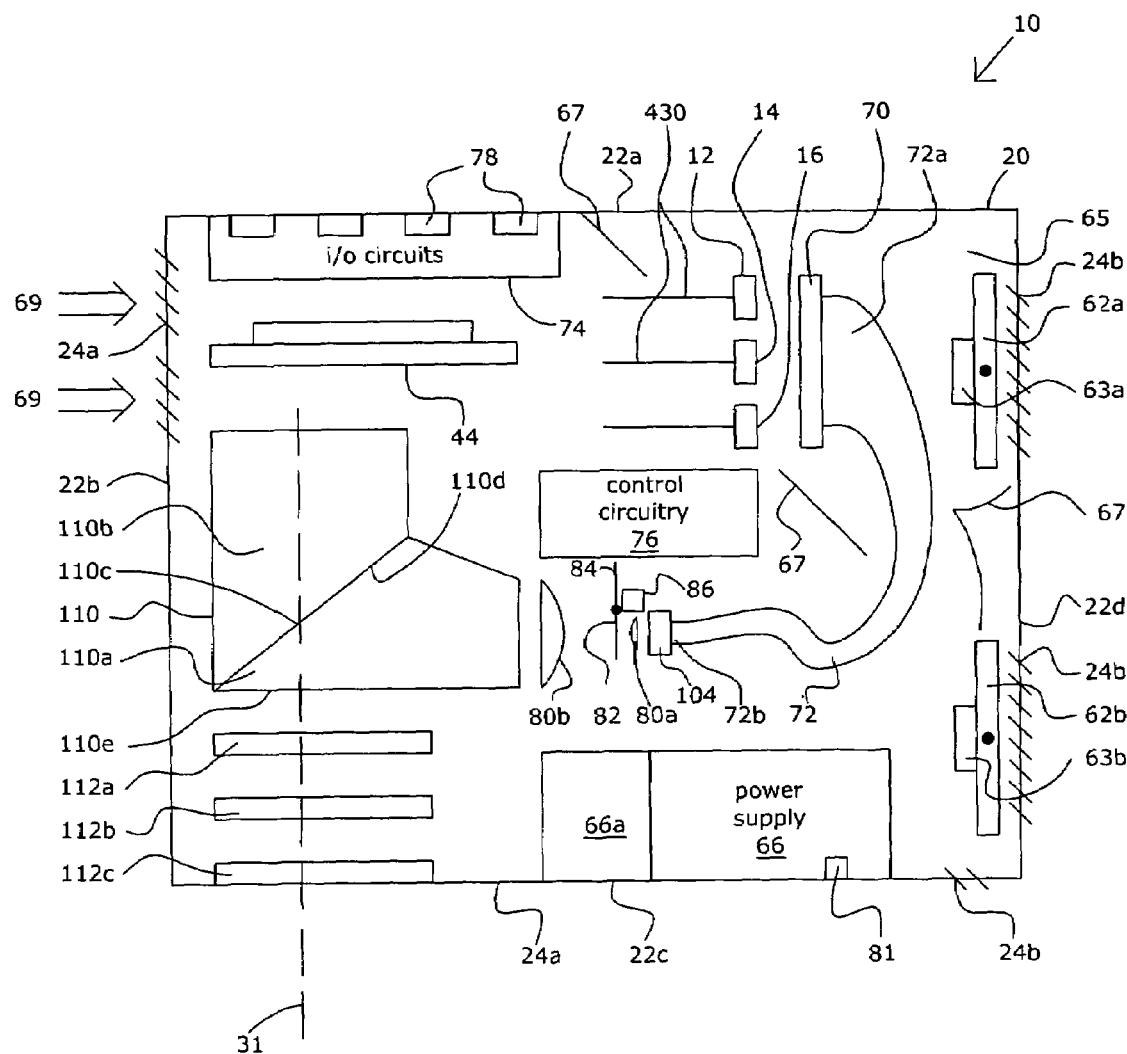
FIG. 1 illustrates a schematic of a projection type display device in accordance with one embodiment of the present invention.

FIG. 1 illustrates a schematic of a projection type display device 10 in accordance with one embodiment of the present invention. Display device 10 is configured to produce and project a video image for display on a receiving surface. Display device 10 employs lasers to generate light. In one embodiment, display device 10 uses three sets of lasers— one for each primary color. As shown, display device 10 comprises a red diode laser set 12, a green laser set 14, a blue laser set 16, housing 20, optical modulation device 44, fans 62, power supply 66, fiber-optic interface 70, fiber-optic cabling 72, input/output circuitry 74, control circuitry 76, input/output interfaces 78, coherence diffuser 82, relay optics 80, prism structure 110 and projection lens system 112.

Housing 20 defines outer dimensions of display device 10 and an inner chamber 65 within display device 10. Housing 20 also provides mechanical protection for internal components of display device 10. As shown, housing 20 comprises four walls 22a–d, a top wall (not shown), and a bottom wall (not shown). Walls 22 define an inner chamber 65 within housing 20. Walls 22a–d comprise a suitably stiff material that grants structural rigidity for display device 10 and mechanical protection for internal components within housing 20, such as a metal or molded plastic. One or more walls 22a–d of housing 20 may also include air vents 24 that permit airflow between chamber 65 and an environment external to housing 20. Vents 24 may also be placed on the top and bottom walls of housing 20.

Power supply 66 provides electrical power to lasers in sets 12, 14 and 16 and other components within display device 10 that consume electrical power. Thus, power supply 66 may provide electrical energy to control circuitry 76, input/output circuitry 74, fans 62 and optical modulation device 44. A power cord port 81 receives a power cord, which couples power supply 66 to an AC power source such as a wall power supply. In one embodiment, conversion of AC power to DC power occurs in a transformer included between ends of the power cord, as is common with many laptop computer power cords, thereby reducing the size of power supply 66 and display device 10 and increasing the portability of display device 10.

In another embodiment, power supply 66 comprises at least one rechargeable battery 66a. Battery 66a may be recharged using power provided through inlet port 81. Battery 66a allows display device 10 to operate on stored energy and without reliance on proximity to an AC power source, which further increases portability of display device 10. For example, inclusion of a battery in housing 20 extends display device 10 usage to settings where AC and fixed power outlets are not available or within reach.

Lasers as described herein, such as those included in sets 12, 14 and 16, produce laser light having a wavelength between about 400 nanometers and about 700 nanometers, which is generally accepted as the visible spectrum. Laser light refers to light that is generated using a lasing mechanism, which in some cases may be manipulated after initial generation to achieve a desired frequency, as will be described in further detail below. Red diode laser set 12, a blue laser set 14, and green laser set 16 produce red, green and blue laser light, respectively.

In one embodiment, each laser emits substantially collimated light. Collimated light differs from radiant light (e.g., from a lamp or light emitting diode) and is characterized by light that travels in about the same direction. Laser light emitted from each laser in sets 12, 14 and 16 may also be characterized as coherent. The coherency of laser light relates to the constancy of the spatial and temporal variations in the light or radiation wave fronts. A high degree of coherence implies a substantially constant phase difference between two points on a series of about equal amplitude wave fronts (spatial coherence); and a correlation in time between the same points on differently wave fronts (temporal coherence). If a laser beam is considered as a plane wave traveling in one direction, it is spatially coherent due to the perpendicularity of wave fronts in the direction of propagation. Also, due to the roughly monochromatic nature of laser light emitted from lasers as described herein, the beam is generally temporally coherent, that is, it will display an about fixed phase relation between a portion of the beam emitted at one time and a portion emitted at another.

Red diode laser set 12 is designed or configured to produce red light for use in display device 10. In one embodiment, each diode laser in red diode laser set 12 generates and emits red light including a wavelength between about 615 and about 690 nanometers. In a specific embodiment, each diode laser in red diode laser set 12 includes a lasing medium and laser cavity configured to generate and emit light including a wavelength between about 625 and about 645 nanometers. Red diode lasers suitable for use in red laser set 12 will be described in further detail with respect to FIG. 2A.

Green laser set 14 is designed or configured to produce green light for use in display device 10. In one embodiment, each laser in green laser set 14 emits light including a wavelength between about 510 and about 570 nanometers. In a specific embodiment, green diode laser set 14 comprises green laser light emitting diode pumped solid state lasers that each emit green light including a wavelength between about 530 nanometers and about 550 nanometers. Green diode pumped solid state lasers suitable for use in green laser set 14 are described in further detail with respect to FIG. 2B.

Blue laser set 16 is designed or configured to produce blue light for use in display device 10. In one embodiment, each laser in blue laser set 16 emits blue light including a wavelength between about 420 and about 500 nanometers. In a specific embodiment, blue laser set 16 includes blue diode lasers and each blue diode laser comprises a lasing medium and laser cavity for generating and emitting light including a wavelength between about 430 and about 460 nanometers. Blue diode lasers suitable for use in blue laser set 16 are described in further detail with respect to FIG. 2A. In another embodiment, blue laser set 16 includes blue laser light emitting diode pumped solid-state lasers, which are described in further detail with respect to FIG. 2B.

In general, the combined power of lasers for each color set may be adapted according to a desired light intensity output for display device 10 and according to the light sensitivity of a viewer to each red, green and blue color, as one skilled in the art will appreciate. The power of an individual laser in a set may vary with design; while the number of lasers in each laser set 12, 14 and 16 will vary with the output power of individual lasers used in the set. Further description of the total power for each color, power output from each laser and the number of lasers in each set 12, 14 and 16 is described below with respect to FIG. 3.

Returning back to FIG. 1, each laser is installed on a circuit board 430, which mounts each laser installed thereon. Circuitry disposed on each board provides electrical communication for each laser installed on a board 430. Multiple lasers may be mounted on a single board 430 to reduce space occupied by laser sets 12, 14 and 16. In one embodiment, circuit boards 430 are vertically arranged to permit passive cooling of boards 430 and each laser disposed thereon when display device 10 is turned off and fans 62 are not moving air through chamber 65. In addition, as described below, circuit boards 430 may be arranged parallel to a major direction of air flow through chamber 65 such that the air passes along both opposing wide area surfaces of each circuit board 430. The boards may also include one or more heat sinks in heat conduction communication with a laser, for cooling boards 430 and individual lasers.

In one embodiment, each laser in sets 12, 14 and 16 includes a sensor that provides feedback regarding laser performance. For example, diode lasers in red diode laser set 12 may include a photodiode chip that provides optical feedback from each diode laser. Information from each photosensor is then provided to control circuitry 76 to provide an indication of laser output for each set 12, 14 and 16.

Control circuitry 76 provides control signals to components within display device 10, and may route data from input/output circuitry 74 to appropriate components within display device 10. Thus, lasers in sets 12, 14 and 16 receive control signals from control circuitry 76 that regulate when each laser is turned on/off. More specifically, control circuitry 76 receives video data included in a signal via one or more input ports 78 and input/output circuitry 74, converts the video data to pixel data on a sequential color frame basis, and delivers the sequential color pixel data to the optical modulation device 44 and to each diode laser. In a combined light transmission path design between lasers in sets 12, 14 and 16 and optical modulation device 44 where light is transmitted along a common light path that transmits red, green and blue light in a sequential red, green and blue order, control circuitry 76 synchronizes the timing of colored data sent to optical modulation device 44 and on/off commands sent to red, green and blue lasers 12, 14 and 16, respectively.

Control circuitry 76 may also include and access memory that stores instructions for the operation of components within display device 10. For example, stored heat regulation instructions may specify control signals sent by control circuitry 76 to fans 62. One or more temperature sensors may also be disposed within housing 20 to facilitate thermal regulation. For example, a temperature sensor may be disposed proximate to circuitry 74 and 76 to monitor temperature levels and participate in closed loop temperature control within display device 10 as determined by stored logic implemented by control circuitry 76. Alternately, temperature sensors arranged for each diode laser may sense temperature levels for each laser and output information that affects fan 24 usage based on stored instructions for desired diode laser temperature levels. Control circuitry 76 may comprise a commercially available processor, controller or microprocessor such as one of the Intel or Motorola family of chips, for example.

Input ports 78 are configured to receive at least one cable, wire, or connector, such as a cable for transmitting a video signal comprising video data from a digital computing device. Common ports suitable for use with input ports 78 include ports that receive S video cable, 6-pin mini DIN, VGA 15-pin HDDSUB, an audio cable, component RCA through an S-Video adaptor, composite video RCA cabling, a universal serial bus (USB) cable, fire wire, etc. Ports 78 may also include an audio output port for receiving a wired connection from speakers included in a headphone or speaker system.

Input/output circuitry 74 provides an interface between control circuitry 76 and one or more interfaces from ports 78. Input/output circuitry 74 and input ports 78 collectively permit communication between display device 10 and a device that outputs a video signal carrying video data. For example, desktop computers, laptop computers, video game consoles, digital cameras, handheld computers, digital video recorders, DVD players, and VCRs, may all output video data to display device 10. Video data provided to control circuitry 76 may be in a digital or an analog form (e.g., from a VCR). In some cases, input/output circuitry 74 and control circuitry 76 convert analog video signals into digital video signals suitable for digital control of an optical modulation device included in display device 10, such as a liquid crystal display "LCD" device or a digital micromirror "DMD" device. Input/output circuitry 74 or control circuitry 76 may also include support software and stored logic for particular connector types, such as processing logic required for S-video cabling or a digital video signal. Control circuitry 76 includes or accesses stored logic in memory to facilitate conversion of incoming data types and enhance video compatibility of display device 10. Suitable video formats having stored conversion instructions within memory accessed by control circuitry 76 may include NTSC, PAL, SECAM, EDTV, and HDTV (1080i and 720p RGBHV), for example.

Fans 62a and 62b move air through inner chamber 65 of housing 20 for cooling components of display device 10. In one embodiment, fans 62 draw air in through inlet air vents 24a on one side of housing 20 and exhaust heated air out of exhaust air vents 24b after the air has cooled internal components of display device 10 and walls of housing 20. One skilled in the art will appreciate that fan 62 and vent 24 placement will vary with internal component placement within light source chamber 65. Specifically, fan 62 placement—and airflow patterns affected by fans 62 within chamber 65—is designed according to individual temperature regulation requirements and heat generation contributions of components within housing 20. Typically, laser sets 12, 14 and 16 and power supply 66 generate the largest proportion of heat within housing 20, while control circuitry 76, optical modulation device 44 and input/output circuitry 74 represent temperature regulation priorities. Correspondingly, inlet air 69 passes in through inlet air vents 24a, initially passes and cools optical modulation device 44, control circuitry 76 and input/output circuitry 74 while the air is relatively cool, passes across power supply 66 and lasers 12, 14 and 16, and exits out exhaust air vents 24b. The exhaust air may also cool fan motors 63a and 63b, which rotate fans 62a and 62b, respectively. In one embodiment, multiple fans 62 are used to permit a lower profile for housing 20. As one skilled in the art will appreciate, the number and size of fans 62 used will depend on heat generation within display device 10 and a desired airflow to maintain one or more heat dissipation goals. Chamber 65 may also include one or more vertical or horizontal airflow guides 67 within light source chamber 65 to direct and distribute airflow as desired. In one embodiment, circuit boards 430 for lasers 12, 14 and 16 are vertically arranged perpendicular to the direction of airflow within chamber 65 and airflow guides 67 are arranged to direct cooling air across the surfaces of each circuit board 430.

In one embodiment, light output from lasers in each set 12, 14 and 16 is provided to fiber-optic cabling 72. Fiber-optic cabling 72 includes one or more fiber optic cables configured to transmit light from lasers in sets 12, 14 and 16 along multiple or common optical paths to relay optics system 80, which is disposed along a light path between an exit end of fiber-optic cabling 72 and an optical modulation device 44. Each cable 72 comprises an inlet end 72a configured to receive light from a laser in one of the sets 12, 14 and 16 and an outlet end 72b configured to outlet the laser light for transmission to relay optics system 80, and subsequent transmission to optical modulation device 44. Since fiber-optic cabling 72 may be bent and flexibly positioned, cabling 72 advantageously permits light transmission between lasers in sets 12, 14 and 16 and relay optics system 80 regardless of the positioning and orientation between the laser sets and optics system 80. For example, this allows flexible arrangement of lasers in sets 12, 14 and 16, relay optics system 80 and prism 110, which may be used to improve space conservation within housing 20, decrease the footprint of housing 20, and minimize display device 10 size.

The number of fiber optic cables in cabling 72 will vary with design. Multiple fiber-optic cables may be employed in a design where each cable services one or more lasers. Multiple fiber-optic cables may be employed in a design where each cable is configured to transmit a primary color. For example, three fiber-optic cables may be employed in which each cable transmits light from a primary color set 12, 14 and 16 along three different optical paths to three primary color dedicated optical modulation devices. Alternately, as shown in FIG. 1, a common fiber-optic cable may be used to transmit sequentially emitted red, green and blue light along a common light path to a single mirror-based optical modulation device 44. Fiber-optic cabling 72 may comprise single mode or multimode fibers such as those readily available from a wide variety of vendors known to those skilled in the art. In some cases, a converging lens is disposed at outlet end 72b when fiber-optic cable 72 is a single mode fiber to correct for any divergence resulting from light transmission within the single mode fiber-optic cable 72.

Fiber optic interface 70 is configured to facilitate transmission of light from each laser into fiber-optic cabling 72. Interface 70 may include one or more fixtures that position and hold an inlet end for each fiber-optic cable included in cabling 72 such that light output from each laser transmits into a fiber-optic cable. Interface 70 may also include optics that direct light from the lasers into cabling 72. In one embodiment, a single fiber-optic cable is used in cabling 72 and fiber optic interface 70 includes a lens system disposed between the outlet of each laser and the inlet of the single fiber-optic cable to direct light from each laser into the single cable. The lens system may comprise at least two lenses: a first lens to direct the light towards the fiber entrance and a second lens that re-collimates light entering the cable. In another embodiment that implements a one-to-one laser to fiber-optic cable 72 relationship, fiber optic interface 70 holds the inlet end for each fiber-optic cable 72 relatively close to the outlet of a single laser to receive light therefrom. Each cable in this case may include a converging lens at its inlet end that facilitates light capture and transmission into the fiber-optic cable. In a specific one-to-one embodiment, each fiber-optic cable in cabling 72 includes a fixture that permits attachment to a laser. For example, conventionally available fiber-optic cables available from vendors such as Ocean Optics Inc. of Dunedin, Fla. include a detachable fixture with a thread that allows screwing and fixing of the fiber-optic cable to a mating thread disposed on a laser housing. In this case, interface 70 comprises the threaded fixture for each fiber-optic cable and a mating thread is added to the laser housing.

In a common light path transmission embodiment, light from lasers in each set 12, 14 and 16 travels along a common path before receipt by optical modulation device 44. In this case, red, green and blue light is provided to fiber-optic cabling 72 in a time synchronous manner that corresponds to red, green and blue video data provided in a video signal to optical modulation device 44. One suitable common light path transmission embodiment is described below with respect to FIG. 4A. In a multiple light path transmission embodiment, separate fiber-optic cables 72 are provided for red light, blue light and green light from red, green and blue laser sets 12, 14 and 16, respectively, to multiple optical modulation devices 44. One suitable multiple light path transmission embodiment is described below with respect to FIG. 4B.

In one embodiment, the outlet end 72b of fiber-optic cabling 72 is positioned and held by an interface 104 such that outlet end 72b outputs light to relay optics system 80. In one embodiment, interface 104 secures fiber-optic cable 72 such that slack is provided in fiber-optic cabling 72 between attachment at the interface and attachment at fiber optic interface 70. The outlet interface 104 may comprise a suitable rigid material such as a molded plastic that is dimensioned to achieve a desired position of outlet end 72b relative to optics system 80. Together, fiber-optic cable 72 and the outlet interface 104 direct light generated by light source 64 to optics system 80.

In a specific embodiment, the present invention includes display devices that provide projection-type video output in a portable and flexible design. The design includes a projection chamber, a base, and an interface that permits relative positioning between the projection chamber and base. Suitable examples of flexible display devices are described in commonly owned co-pending patent application naming William J. Plut as inventor, filed on the same day as this application and entitled "POSITIONABLE PROJECTION DISPLAY DEVICES". This application is incorporated by reference in its entirety for all purposes.

Optics system 80 converts light received from fiber-optic cabling 72 to light flux suitable for transmission onto optical modulation device 44 via prism structure 110. This may include shaping and resizing light flux received from cable 72 using one or more lenses, and may include homogenizing intensity across the light flux distribution. To do so, optics system 80 may comprise one or more lenses suitably spaced and arranged within housing 20. In one embodiment, lens 80a is selected and arranged to increase the area of light flux received from fiber-optic cable 72, while lens 80b is selected and arranged to convert the divergent light transmitted by lens 80a into substantially collimated flux for transmission onto optical modulation device 44.

Some projected images produced by a display device that uses lasers for light generation may encounter speckle effects. Speckle is an interference pattern produced when laser light strikes a non-specular surface (a rough surface relative to the wavelength of light). Speckle effects are caused by interference between superimposing waves of coherent light reflected from the non-specular reflecting surface. Since laser light is generally monochromatic and in phase (coherent), when the light is scattered by the non-specular reflecting surface, it becomes out of phase and the waves collide. When two waves out of phase collide, e.g., a wave at a high peak and another at a low peak, the two waves superimpose and may cancel each other out—resulting in a dark space. Cumulatively, speckle often produces a three-dimensional pattern of light and dark spaces, perceivable to a viewer as a dark pattern or spots around the projected image. Speckle may detract from the quality and appearance of the laser-based projected output. Generally, any laser with coherence properties may produce speckle effects. An incandescent light bulb, non-lasing light emitting diode, or white light lamp may also produce speckle effects, however, the speckle effects for these light sources are generally in the micrometer range (or less) and well below perception levels of human vision. Laser speckle, on the other hand, often results in interference patterns in the millimeter range and within human perception levels.

In one embodiment, the present invention reduces potential speckle effects for a projected image produced using laser light. To do so, the present invention reduces coherence of the laser light to diminish any potential speckle that results from reflection of the projected image off of a non-specular surface. This may be accomplished by introducing a coherence diffuser in the light path of the laser light within display device 10. In a specific embodiment, the coherence diffuser is a rotating or vibrating diffuser, such as a transparent rotating glass or plastic screen introduced into the light path. Arranging the coherence diffuser in an unfocused beam reduces both temporal and spatial coherence. Arranging the rotating diffuser at the focus of a beam reduces only the temporal coherence—while maintaining the spatial coherence (the ability for the beam to be focused to a point).

Referring back to FIG. 1, a rotating diffuser 82 is disposed between lenses 80a and 80b. Rotating diffuser 82 comprises a transparent glass screen 84 that is rotated by a motor 86. As shown in FIG. 1, rotating diffuser 82 intercepts an unfocused beam, thereby reducing both temporal and spatial coherence, and reducing potential speckle in the output image. In another embodiment, rotating diffuser 82 is introduced into the light path between the exit the fiber optic cabling 72 and before receipt by lens 80a.

Figure 4A:
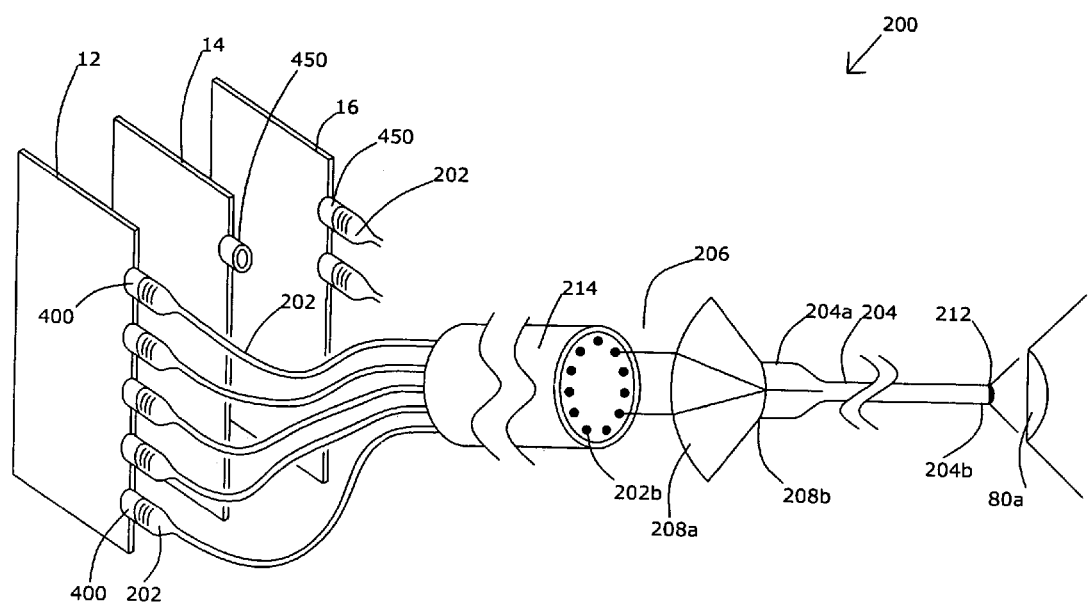
FIG. 4A illustrates a common fiber-optic cabling arrangement in accordance with a specific embodiment of the present invention.

One skilled in the art will appreciate that rotating diffuser 82 may be arranged in other locations along the light path between generation of laser light in laser sets 12, 14 and 16 and output of the projected image from projection lens 112c. For example, rotating diffuser 82 may be arranged proximate to a junction where light from multiple fiber optic cables is transmitted into a common fiber optic cable (FIG. 4A). In this case, rotating diffuser 82 may be arranged at the focus of a beam to only reduce temporal coherence—while maintaining the spatial coherence (the ability for the beam to be focused to a point). Rotating diffuser 82 may also be arranged to intercept light between a laser and a fiber optic coupling, or between a final relay lens and prism 110, for example. In one embodiment, the coherence diffuser is arranged to intercept laser light before it is expanded in flux area by any relay optics. Intercepting a small flux area light beam reduces the size of the glass screen 84 and coherence diffuser motor 86.

In one embodiment, optics system 80 comprises a pair of fly-eye lenses arranged in the optical path between lasers in sets 12, 14 and 16 and prism 110, such as between lens 80b and prism 110. Cumulatively, the pair of fly-eye lenses re-distribute light uniformly across the flux transmitted onto optical modulation device 44. The first fly-eye lens includes a plurality of lenses that spatially divide input light flux (e.g., from lens 80b) into a set of blocks or components that each comprise a portion of the total inlet flux area, and transmits light for each block to a corresponding block in the second fly-eye lens. The second fly-eye lens includes a plurality of lenses, the number of which is the same as the number of lenses in the first lens, and outputs light for each component to an object region to be illuminated in such a manner that the partial luminance fluxes from each lens are superimposed on each other at the object region.

In another embodiment, optics system 80 comprises an integrator tunnel disposed in the optical path between lasers in sets 12, 14 and 16 and prism 110, such as between lens 80b and prism 110. The integrator tunnel uses total internal reflection to output luminous flux with an about uniformly distributed intensity across a shape determined by an output geometry at output end, which is typically rectangular. The outlet may also be dimensioned to match the aspect ratio of the downstream optical modulation device 44. The integrator may comprise a solid glass rod such as those known and used in the art. If required, one or more lenses may be arranged to re-size flux output by the integrator tunnel from a size that exists at an output end to a size that is suitable for reception by optical modulation device 44.

Prism structure 110 provides light to optical modulation device 44 at predetermined angles, and transmits light from optical modulation device 44 to the projection lens system 112 along output path 31. Prism structure 110 comprises prism components 110a and 110b that are separated by air space or bonding interface 110c. Interface 110c is disposed at such an angle so as to reflect light provided from optics system 80 towards optical modulation device 44. In addition, interface 110c allows light reflected by optical modulation device 44 to transmit to projection lens system 112 along output path 31.

Optical modulation device 44 selectively transmits light to provide an output image along output light path 31. To do so, optical modulation device 44 is supplied with video data included in a video signal and selectively transmits light according to the video data. The video data is typically provided to device 44 on a frame-by-frame basis according to individual pixel values. If the video data is not received by display device 10 in this format, control circuitry 76 in housing 20 converts the video data to a suitable format for operation of optical modulation device 44. In one embodiment, individual light modulation elements within optical modulation device 44, which each correspond to an individual pixel on the output image, translate received digitized pixel values into corresponding light output for each pixel.

In one embodiment, optical modulation device 44 is a mirror based spatial light modulator, such as a digital micromirror device (or DMD, a trademark of Texas instruments Inc.) commercially available from Texas Instruments, Inc. Any XGA or SVGA resolution chip in the SDR or DDR series is suitable for use with the present invention. In this case, optical modulation device 44 comprises a rectangular array of tiny aluminum micromechanical mirrors, each of which individually deflects about a hinged axis to selectively reflect output image light down output path 31, and reflect non-image light away from output path 31. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along output light path 31, through prism structure 110, and out of display device 10 using projection lens system 112.

The arrangement of optics system 80 and the faces of prism structure 110 control the illumination angles for optical modulation device 44. After light reflection by individual mirrors of optical modulation device 44, reflected light exits prism structure 110 towards lenses 112 along output optical path 31. Output projection path 31 characterizes a) the direction of image light selectively transmitted by optical modulation device 44 within display device 10, and b) the direction of light output from display device 10. For light selectively transmitted by optical modulation device 44, path 31 extends as a straight line from optical modulation device 44 for elements in their 'on' state, through prism structure 110, and out projection lens 112c.

A projection lens system 112 is disposed along output path 31 configured to project light transmitted by the optical modulation device along path 31 from display device 10. Projection lens system 112 manipulates image light transmitted by optical modulation device 44 along output path 31 such that a projected image cast on a receiving surface enlarges as distance from output lens 112c to the receiving surface increases. Projection lens system 112 comprises lenses 112a, 112b and external lens 112c, each of which is disposed centrically along and orthogonal to output light path 31. Distances between each lens 112 may vary with a desired splay angle from output lens 112c, as may the number of lenses 112 used. In one embodiment, display device 10 is designed for a short throw distance, such as between about six inches and about 15 feet. Display device 10 may also include one or more buttons or tools that allow a user to manually focus and manually zoom output from projection lens system 112.

In operation, light generated by lasers in sets 12, 14 and 16 is collected by and transmitted within fiber-optic cables 72. Relay lenses 80a and 80b convert light transmitted by fiber-optic cable 72 to a luminous flux size suitable for transmission onto optical modulation device 44 via reflection within prism 110. Light propagating through prism component 110a reflects off a surface 110d at interface 110c by total internal reflection and forms a reflected pre-modulated beam directed towards optical modulation device 44. The reflected pre-modulated beam travels through prism component 110a to reach optical modulation device 44, which selectively transmits light according to video data in a signal that corresponds to an image to be projected. Each mirror in optical modulation device 44 reflects light in its 'on' state back into prism component 110a and through interface 110c without internal reflection such that the light propagates into prism component 110b and out an exit face 110e of prism 110. Light output through exit face 110e is characterized by optical path 31, which propagates through one or more projection lenses 112 that manipulate image light for enlarged display onto a screen or suitable receiving surface. Typically, the image is cast with a splay angle such that the image enlarges as the distance to a receiving surface increases.

Figure 2A:
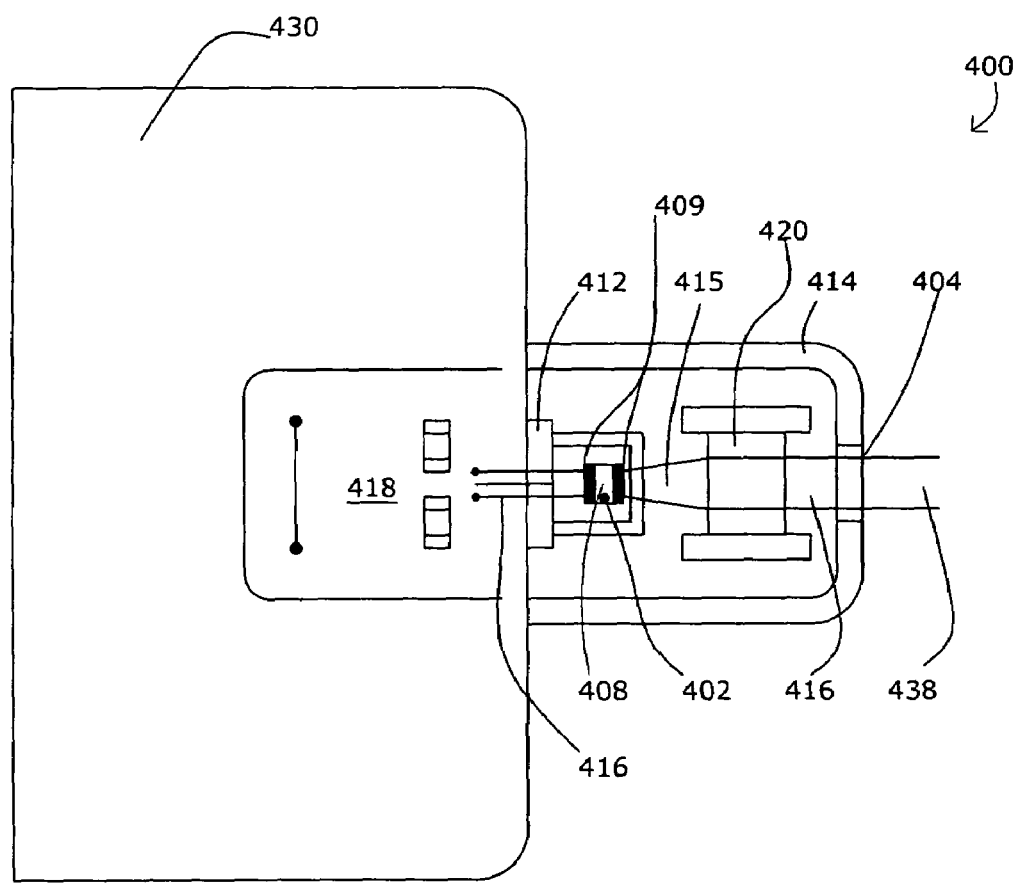
FIG. 2A illustrates a simplified diode laser in accordance with a specific embodiment of the present invention.

In one embodiment, red and/or blue laser sets 12 and 16 comprise one or more diode lasers. FIG. 2A illustrates a diode laser 400 in accordance with a specific embodiment of the present invention. As the term is used herein, a diode laser refers to a device, system or module that outputs laser light and employs a semiconductor to generate the laser light. Diode laser 400 is also commonly referred to as a semiconductor laser, a laser diode or injection laser. Diode laser 400 comprises lasing medium 402, output lens 404, lasing chamber 408, monitor photodiode chip 412, housing 414, leads 416, control circuitry 418 and correction lens 420.

Lasing medium 402 includes a charge carrier in a semiconductor and generates laser light according to a lasing mechanism. The lasing mechanism, or lasing action, refers to the process by which laser light is generated by diode laser 400. In one embodiment, lasing medium 402 comprises a material which can be excited to a higher or metastable energy state in which atoms or molecules can be trapped after receiving energy from a pumping system. As a first atom or molecule in the higher state decays, it triggers via stimulated emission, the decay of another atom or molecule in a higher state. When one of the decaying atoms or molecules releases a photon parallel to the axis of the lasing material, it triggers the emission of other photons, all of which will be reflected by reflective faces 409 in the lasing chamber 408.

Lasing chamber 408 contains lasing medium 402 and opposing reflective faces 409 disposed on opposite ends of the lasing chamber. Lasing chamber 408 and reflective faces 409 cumulatively provide a resident cavity in which laser light is generated. For a side emitting design, the reflecting faces 409 allow stimulated light to bounce back and forth through the lasing medium 402 to increasingly generate laser light. For small, edge emitting diode lasers, lasing chamber 408 may be formed inside the semiconductor diode laser chip itself and reflective faces 409 may include cut surfaces of the semiconductor crystal. Alternately, reflective faces 409 may comprise an optically ground, polished and/or coated material. For example, one or both of reflective faces 409 may be anti-reflection coated with external mirrors are added. One of the reflective faces 409 is semi-transparent and permits the escape of light from lasing chamber 408 for output of an initial laser beam 415.

For diode laser 400, the wavelength output light is determined by the lasing medium 402 material and the geometry of lasing chamber 408. For a red diode laser, lasing medium 404 often comprises two layers of semiconductor material sandwiched together on a semiconductor chip 406 in lasing chamber 408. Galluium-Arsenide is one suitable lasing medium used to generate red laser light, while other semiconductor materials may be used to generate a desired wavelength of laser output.

In one embodiment, a beam from the diode laser chip strikes a photodiode or photodiode chip 412. Photodiode 412 facilitates feedback control of power output from diode laser 400. More specifically, diode laser 400 employs a built-in photodiode 412 and optical/electronic feedback control to regulate current—and thus regulate output beam power, as described in further detail with respect to control circuitry 418. Diode laser 400 thus relies on closed loop regulation using optical feedback to stabilize beam power, which is useful to compensate for temperature variations and to assist consistent output laser light wavelength and intensity. In a specific embodiment, photodiode chip 412 is built-in to the back side of lasing chamber 408. In another embodiment, diode laser 400 employs a photodiode 412 and optics that are external to lasing chamber 408 to monitor laser light beam output from laser 400 for feedback control and output laser light power regulation.

Diode laser 400 relies on input energy to excite lasing medium 402. Semiconductor lasers are commonly pumped by externally applied current, while optical and electron beam pumping may also be used. Leads 416 provide electrical communication between diode laser 400 and control circuitry 418 disposed on a board 430. In one embodiment, three leads 416 are included. Two leads provide controlled electrical energy to lasing medium 402 and lasing chamber 408. Two of the leads 416 also provide electrical communication between photodiode 412 and control circuitry 418, thereby permitting an output signal from photodiode 412 to control circuitry 418 for closed feedback control of power output from laser data 400.

Control circuitry 418 regulates current provided to diode laser 400. Typically, diode laser 400 has a minimum current above which lasing action takes place. Thus, when control circuitry 418 receives an on/off command from controller 42 for display device 10, control circuitry 418 maintains current provided to lasing medium 402 above the lasing current threshold. In addition, diode laser 400 typically has a maximum current threshold, which when exceeded may result in damage to diode laser 400. In this case, control circuitry 418 prevents current greater than the maximum current threshold from reaching diode laser 400. The minimum and maximum current thresholds will vary with particular devices, designs and materials, as one of skill in the art will appreciate. In addition, control circuitry 418 may also implement a safety buffer relative to the maximum current threshold such that the maximum current ever seen by the diode laser remains safely below the maximum threshold. Thus, each diode laser operates over an input current range between the minimum lasing current and the maximum current threshold (or a safety level relatively close). Output light power from diode laser 400 may vary with current level within this range. Control circuitry 418 then controls input current to achieve a desired output light power or intensity from diode laser 400.

In one embodiment, output light intensity control for diode laser 400 employs a closed-loop feedback scheme. One suitable closed-loop feedback scheme relies on optical feedback from photodiode 412, which is arranged inside the diode laser housing 414. Control circuitry 418 then cooperates with photodiode 412 to provide a current that results in a desired power for light produced by diode laser 400. A fixed reference, such as a fixed voltage included in the circuit or stored logic for reference by a microcontroller, may be used to designate a desired input current or a desired output light intensity. Control circuitry 418 then controls optical output from diode laser 400 by regulating input current based on feedback with respect to the fixed reference. Control circuitry 418 may thus maintain output laser power at an about constant level regardless of input power variations, such as input power that varies when display device 10 employs a battery that nears the end of its limited resources. Some diode lasers have transient light output power with device temperature. In this case, control circuitry 418 cooperates with photodiode 412 to ensure that light output power is consistent regardless of device temperature.

Control circuitry 418 is arranged on printed circuit board 430 and electrically connected to leads 416. As mentioned above, display device 10 includes power supply 38 that either receives DC input or converts AC voltage to DC voltage for use with in display device 10. In one embodiment, control circuitry 418 comprises a driver circuit capable of operating on regulated DC input. By providing regulated current, control circuitry 418 thus acts as the pumping system that imparts electrical energy to the atoms or molecules of lasing medium 402, enabling them to be raised to an excited metastable state and create laser light.

Housing 414 defines the outer dimensions of the diode laser 400 package and provides structural support and mechanical protection for components arranged therein. Housing 414 may comprise brass, copper, aluminum or another suitable metal, for example, which are beneficial for heat dissipation.

Collimation, astigmatism, divergence, and/or an elliptical profile may be used to characterize laser light produced by a diode laser. Collimation refers to the degree to which the beam remains parallel with distance. Many diode lasers emit a divergent beam, having a splay angle that varies from five to forty degrees in each orthogonal direction. In one embodiment, laser 400 is an edge emitting diode laser. The raw output beam from an edge emitting diode laser is commonly divergent and includes two asymmetries: astigmatism and an elliptical beam profile. The astigmatism and elliptical beam profile are a product of unequal divergence in orthogonal directions. Display devices of the present invention may include one or more lenses that alter a laser beam property such as astigmatism, divergence, elliptical profile and/or increase collimation.

In one embodiment, display device 10 comprises optics that alter one or more beam characteristics of an initial laser beam 415 emitted from lasing chamber 408. As shown in FIG. 2A, internal lens 420 is disposed within housing 414, between output lens 404 and lasing chamber 408, and alters laser light generated within diode laser 400 before exit from output lens 404. In a specific embodiment, lens 420 is an internal microlens that reduces divergence in one or more directions for initial laser beam 415 and outputs a corrected internal beam 416 from its exit surface having less divergence in one or more directions relative to the incident beam 415. In another specific embodiment, lens 420 reduces astigmatism for initial laser beam 415 and outputs corrected internal beam 416 having less astigmatism relative to the incident beam 415. A custom dimensioned convex or positive lens 420 may be employed to reduce divergence. Dimensioning of lens 420 will vary with the divergence in the initial laser beam 415, which will depend on specific parameters for diode laser 400 such as the shape of the emitting aperture for lasing chamber 408, as one skilled in the art will appreciate. Lens 420 may comprise any suitably shaped redirection optics, such as a custom-made glass or plastic shaped lens, or one or more prisms. In a specific embodiment, lens 420 is made from glass and ground to a suitable dimensions to correct for any divergence. Diode laser packages with correcting microlenses are also available from Blue Sky Research of Milpitas, Calif.

Reducing divergence in beam 415 and collimating output from diode laser 400 simplifies light transmission and subsequent light manipulation within display device 10. Lens 420 is advantageous since, without the presence of lens 420, a significant amount of initially generated light may not escape though lens 404 and be wasted before output from lens 404 due to divergence of the initial beam 415 within diode laser housing 414. Internal lens 420, however, converts divergent laser light into collimated output before significant light loss within housing 414. This arrangement allows diode laser 400 to output a larger portion of the total light generated in lasing chamber 408, thereby increasing output light power and light efficiency for diode laser 400 and display device 10.

Divergence correction may also be performed in other locations. In one embodiment, output lens 404 is dimensioned to correct for any divergence in a laser beam generated in lasing chamber 408. In another embodiment, a collimating lens is glued, epoxied or otherwise attached to the outside the housing 414. Alternately, divergence correction and collimation may occur in a lens included in a one-to-one coupling fixture that interfaces a fiber-optic cable to diode laser 400.

Lens 420 may also reduce or alter any astigmatism in initial laser beam 415. The astigmatism causes the focal length required to collimate the laser beam in orthogonal directions, such as in x and y directions, to differ. Without correction, the asymmetry in orthogonal directions results in a beam with an elliptical profile. In one embodiment, lens 420 is custom shaped to reduce astigmatism. More specifically, lens 420 is ground with an astigmatic curvature to compensate for differing divergences in orthogonal directions of the generated laser light. Thus, lens 420 may unequally reduce divergence in the fast axis relative to the slow axis for diode laser 400. For example, lens 420 may reduce divergence by 30 degrees in the fast axis and by 5 or 10 degrees in the slow axis. The present invention may alternatively correct for astigmatic variations in the laser output in locations other than internal lens 420. For example, lens 404, a lens externally attached to housing 414, or another downstream lens in the optical path may be dimensioned to reduce astigmatic variations resulting from diode laser usage.

In addition, multiple lenses such as lens 420, lens 404, a lens externally attached to housing 414, or another downstream lens in the optical path, may cooperate to cumulatively provide a desired output beam. For example, lens 420 may reduce any initial astigmatism in initial laser beam 415, but leave a minor amount of divergence in the corrected internal beam 416, which is subsequently corrected by lens 404. The specific alterations performed by each lens will depend on the initial beam shape and a desired beam shape for transmission within the display device 10. In one embodiment, laser light having a circular beam with substantially no divergence is transmitted into a fiber optic cable for subsequent optical manipulation in display device 10. In another embodiment, laser light having an elliptical beam profile with substantially no divergence is transmitted into fiber optic cables. In this case, the elliptical beam profile encompasses an aspect ratio for the optical modulation device 44, and is subsequently manipulated and cut to a rectangular size that matches the aspect ratio. Since light initially output from lasing chamber 408 is substantially uniform in intensity across the laser light beam flux, early correction of any unwanted laser beam characteristics advantageously maintains about uniform intensity across the light beam flux.

Additional optics configurations may be employed to alter one or more beam characteristics of an initial laser beam 415 emitted from lasing chamber 408. In one embodiment, output lens 404 corrects for divergence, astigmatism and elliptical output in a custom shaped single lens dimensioned for diode laser 400. In another embodiment, the elliptical beam profile and astigmatism are corrected at once by coupling the output laser beam into a single mode optical fiber using two lenses. In some case, the output face quality of a fiber optic cable may affect output beam characteristics. A collimating lens disposed proximate to the outlet end of the fiber may then be employed to correct for any divergence in the outlet beam emitted from the fiber.

Output lens 404 emits laser light produced within diode laser 400. An output light beam 438 emitted from output lens 404 thus forms the output for diode laser 400. Output lens 404 may comprise plastic or ground glass. As described above, output lens 404 may be specially dimensioned to alter one or more characteristics in the output laser light. Lens 404 may also include one or more coatings, such as a coating to filter and remove infrared (IR) energy. In another embodiment, a separate IR filter is arranged within housing 414 to filter infrared energy and prevent it from escaping housing 414.

Diode laser 400 may also include heat dissipation assistance. In one embodiment, board 430 is separated from surrounding components such that airflow via fans 62 cools board 430 and each diode laser 400 disposed thereon. One diode laser 400 design employs a metal housing 414, which in addition to holding the optics and internal components, acts as a heat sink for the semiconductor diode laser chip 412. Cooling air provided via fans 62 may thus cool the relatively larger surface area provided by housing 414 to improve temperature regulation of diode laser 400. Alternately, each diode laser chip 412 may be mounted directly onto a separate heat sink to facilitate removal of heat from the chip. The heat sink may extend from housing 414 to receive cooling air provided by fans 62.

In one embodiment, diode laser 400 is responsible for the generation of red light. In this case, diode laser 400 includes a lasing medium and laser cavity configured to produce and emit light having a wavelength between about 615 and about 690 nanometers. In a specific embodiment, diode laser 400 produces and outputs red light having a wavelength between about 625 and about 645 nanometers. Many commercially available Gallium Arsenide (GaAs)-based red diode lasers output red light in this range. Red diode lasers are widely available from a variety of vendors known to those skilled in the art, such as Lasermate Group Inc. of Pomona Calif.

In another embodiment, diode laser 400 is responsible for the generation of blue light. In this case, diode laser 400 includes a lasing medium and laser cavity configured to produce and emit light having a wavelength between about 420 and about 500 nanometers. In a specific embodiment, diode laser 400 produces and outputs blue light having a wavelength between about 430 and about 460 nanometers. Blue diode lasers that output light including a wavelength between about 430 and about 460 nanometers are available from Nichia America Corporation of Mountville, Pa.

Figure 2B:
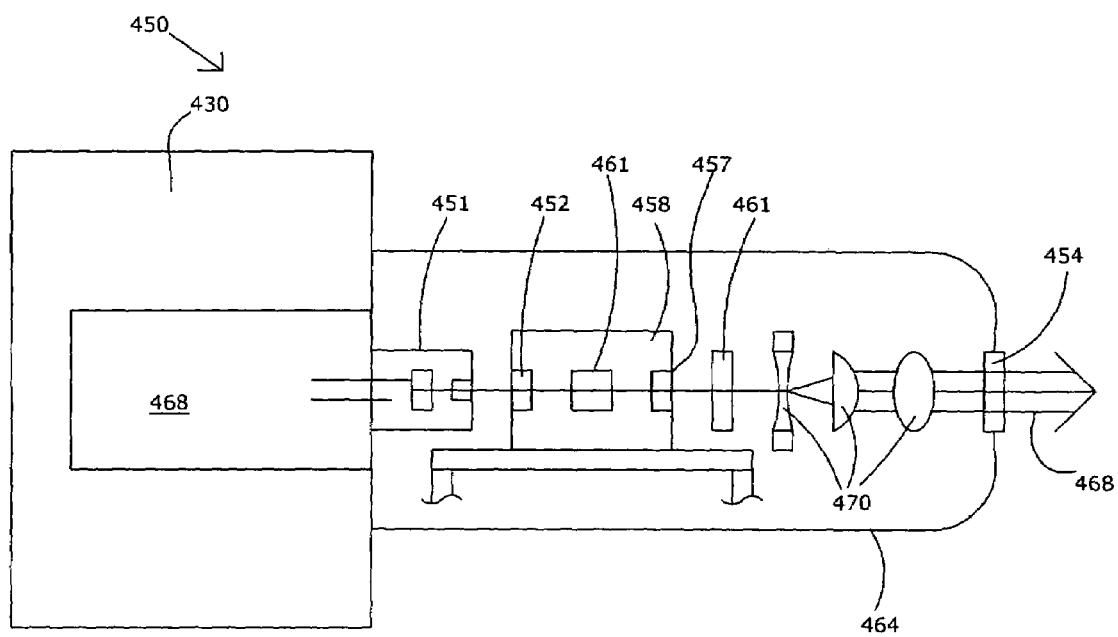
FIG. 2B illustrates a DPSS laser schematic in accordance with a specific embodiment of the present invention.

In one embodiment, green laser set 14 and/or blue laser set 16 comprises one or more diode pumped solid-state (DPSS) lasers. Solid-state lasers generally employ a crystal doped with an impurity within their active lasing medium. A DPSS laser refers to a device, system or module that outputs laser light. FIG. 2B illustrates a DPSS laser schematic 450 in accordance with a specific embodiment of the present invention. DPSS laser 450 comprises a pumping light source 451, lasing medium 452, output optics 454, lasing chamber 458, housing 464, control circuitry 468, and optics 470.

Lasing chamber 458 includes a lasing medium 452 on an inlet end and an output coupler mirror 457 on the opposite outlet end. Lasing medium 452 includes a crystal doped with an impurity, which generates laser light in response to input pumping energy. Suitable DPSS lasers may employ a crystal doped with Neodymium (Nd), such as Nd:YAG (Nd:Yttrium Aluminum Garnet) or Nd:YVO$_4$ (Nd Yttrium Ortho Vanadate). Lasing medium 452 is disposed on a metal heat sink 457 to facilitate heat dissipation. Lasing medium 452 generates energy in an IR region of the spectrum, which is reflected by mirror coatings on lasing medium 452 and output coupler mirror 457. The mirror coating on the lasing medium 452 transmits the pumping light from light source 451, while the coating on the coupler mirror 457 passes the visible wavelength output by laser 450. In one embodiment, a crystal 461 comprising a non-linear electro-optic material is disposed in chamber 458. When mounted at a suitable orientation along the path of the IR beam, crystal 461 converts a portion of the IR beam generated by medium 452 to visible light having a fraction of the IR wavelength, such as half the IR wavelength. This visible light passes through output coupler mirror 457, and out from chamber 458. For green-colored laser output, the DPSS laser is designed for second harmonic output, such as second harmonic 512 nanometer green laser light output from a Nd:YAG lasing medium that produces 1064 IR radiation. DPSS laser 450 may also be designed for higher frequency multiplication.

Pumping light source 451 imparts energy into lasing chamber 458 to excite lasing medium 452. For infrared diode lasers used in pumping light source 451, the wavelength of the pump diode laser 451 is selected to match an absorption line in lasing medium 452. For Nd:YAG and Nd:YVO$_4$, this is about 800 nm. The pump diode laser 451 may also be attached or mounted onto a metal heat sink for heat dissipation. Optics may also be arranged between the pump diode laser 451 and lasing chamber 458 to modify the pumping laser light beam transmitted therebetween. Alternately, the diode laser may be positioned relatively close to lasing chamber 458 without intermediate optics.

Housing 464 defines outer dimensions of the laser 450 package; and provides structural support and mechanical protection for components arranged therein. Housing 464 may comprise brass, copper, aluminum or another suitable metal that improves heat dissipation when in thermal communication with one or more heat generating portions of laser 450. Each DPSS laser 450 also includes an IR filter 461 that prevents transmission of infrared radiation from housing 464. Filter 461 may also be provided as a coating a lens included in laser 450, such as output lens 454.

Optics 470 includes one or more lenses that alter the laser beam produced in lasing chamber 458 to a desired shape and flux area. In one embodiment, optics 470 comprise an expanding lens and collimating lens that increase the flux area and re-collimate the light, respectively. Output lens 454 allows light generated within laser 450 to escape housing 464. An output light beam 468 emitted from output lens 404 thus forms the output for laser 450.

Control circuitry 468 regulates laser 450 output. In response to on/off commands from controller 42, circuitry 468 regulates current provided to pumping diode laser 451, which acts as a pumping system that imparts light energy to the atoms or molecules of lasing medium 452. Control circuitry 468 is arranged on printed circuit board 430 and electrically connected to leads of the pumping diode laser 451. Laser 450 also may comprise an optical sensor, such as a monitor photodiode chip, for detecting light output from laser 450.

In one embodiment, DPSS laser 450 is responsible for the production of green light. In this case, DPSS laser 450 produces and emits light having a wavelength between about 510 and about 570 nanometers. In a specific embodiment, DPSS laser 450 produces and emits green light having a wavelength between about 530 and about 550 nanometers. Many commercially available DPSS lasers, such as those available from Lasermate Group Inc. of Pomona, Calif., output green light in this range. In another embodiment, one or more diode pumped solid-state lasers are responsible for the generation of blue light. Similar to green DPSS lasers, blue DPSS lasers employ a doubling or tripling of an infrared line, such as direct doubling of an 800+ nanometer IR diode laser (e.g., doubling of a 946 nanometer line to produce a 473 nanometer blue light). Suitable blue DPSS lasers are available from a variety of vendors, such as Lasermate Group Inc.

Figure 3:
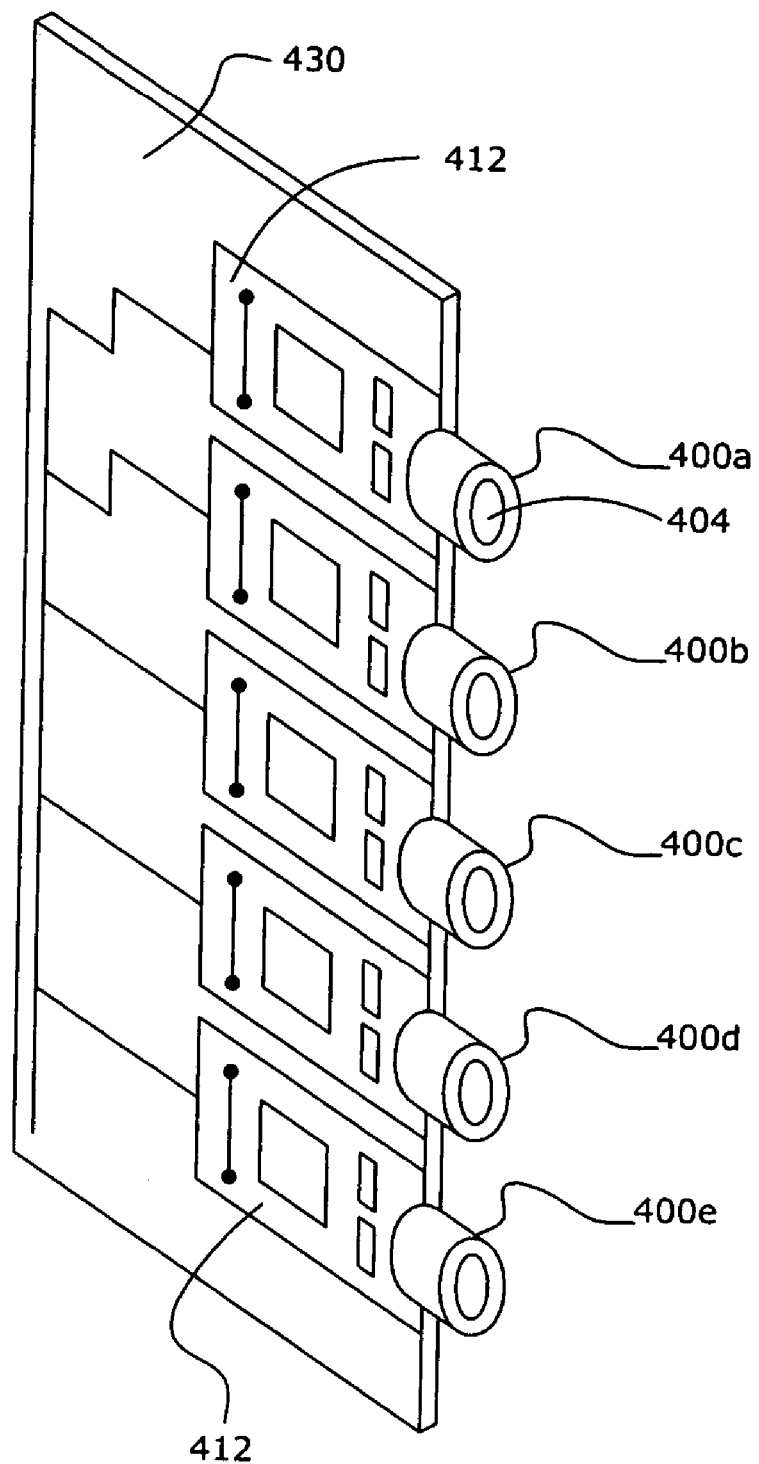
FIG. 3 illustrates a circuit board with multiple diode lasers installed thereon in accordance with one embodiment of the present invention.

As mentioned above, one or more lasers are installed on a circuit board 430, which mounts, and provides electrical communication for, each laser installed thereon. FIG. 3 illustrates a board 430 with five diode lasers 400a–e installed thereon in accordance with one embodiment of the present invention. This configuration reduces space for laser sets 12, 14 and 16 within display device 10. Control circuitry 412 on board 430 regulates current provided to each diode laser 400a–e. Although board 430 shows five diode lasers 400, it is understood that board 430 may include a combination of diode lasers 400 and DPSS lasers 450. In one embodiment, diode lasers 400a–e all output light having a similar wavelength, such as red. In another embodiment, lasers on a single board 430 output different colors.

Each color or set 12, 14 and 16 produces a desired amount of light, achieved by the cumulative output from individual lasers in each set. The desired amount of light for each color or set 12, 14 and 16 may be quantified as a luminous power; and determined in design according to a desired total light intensity output for display device 10. In one embodiment, each red, green and blue laser set 12, 14 and 16 is designed to produce light from about 500 mW to about 10 W in luminous power. In a specific embodiment, each red green and blue laser set 12, 14 and 16 outputs between about 1 W and about 3 W. The desired light output for each color or set 12, 14 and 16 may also be adapted according to the efficiency of the laser/fiber optic coupling system and other luminous inefficiencies in display device 10.

The power of an individual laser in a color set may vary with design, while the number of lasers in each laser set 12, 14 and 16 and on each board 430 will vary with the output power of individual lasers in the set and the total luminous intensity for each color in display device 10. Output power for each laser 400 or 450 may range from 5 mW up to 10 W, for example. Red diode lasers 400 are commercially available with power outputs up to 500 mW, and up to 1000 mW with suitable drive and current control electronics. Green DPSS frequency doubled frequency doubled Nd:YAG lasers are also commercially available with power outputs ranging from 5 mW each to 10 W each. In one embodiment, each set 12, 14 and 16 comprises from 1 to 60 lasers. In another embodiment, from 4 to 20 lasers are suitable to achieve a cumulative power output for an individual color. For example, if 3W of luminous output power is desired for each color, red diode laser set 12 may include 6×500 mW diode lasers 400 arranged on one or two boards 430 or 3×1000 mW diode lasers 400 arranged on a single board 430, green laser set 14 may include 6×500 mW DPSS lasers 450 arranged on one or two boards 430 or 3×1000 mW DPSS lasers 450 arranged on a single board 430, while blue laser set 16 may include 6×500 mW DPSS lasers 450 arranged on one or two boards 430 or 3×1000 mW DPSS lasers 450 arranged on a single board 430. For larger sets, multiple boards 430 for each color may be implemented and arranged side-by-side. In this manner, significant laser power may be generated in a compact and highly portable package.

The desired amount of light output power by each set 12, 14 and 16 may also vary with viewer sensitivity to the each wavelength. Since lasers output generally monochromatic light in a small wavelength range, and human vision receives light of different wavelengths with varying magnitude, the ratio of power provided by red, green and blue laser sets 12, 14 and 16 may be scaled according to human sensitivity for each wavelength range. Thus, the present invention may employ less or more total output power for a specific primary color or set 12, 14 and 16 based on the sensitivity of human vision to each wavelength. Desired total output powers for each color may then vary with the wavelengths used, as one of skill the art will appreciate. For example, red diode lasers 400 may output red light having a frequency of about 635 nanometers, which corresponds to a C.I.E. Phototopic Luminous Efficiency Function coefficient of about 0.21 (a coefficient of 1.0 corresponds to a green at 555 nanometers). Green DPSS lasers 450 may output green light having a wavelength of about 532 nanometers, which corresponds to a coefficient of about 0.89. Blue diode lasers 400 may output blue light having a frequency of about 435, while blue DPSS lasers 450 may output blue light having a frequency of about 473, which corresponds to a coefficient of about 0.10. The coefficients for these wavelengths may then be used to determine desired power output for these lasers when used in sets 12, 14 and 16.

In one embodiment, display device 10 includes redundant light supply for each color and each laser set 12, 14 and 16.

This implies that each set 12, 14 and 16 includes more lasers and a greater maximum luminous power output for each color than needed for normal operation of display device 10. One or more lasers in each set may then be turned off during normal operation. Thus, in the example described above where 3W of total luminous output power is desired for red diode laser set 12, set 12 may include 8×500 mW diode lasers 400 arranged on one or two boards 430 or 4×1000 mW diode lasers 400 arranged on a single board 430. In the former case, two of the 500 mW diode lasers 400 are turned off during normal usage. In the latter case, one of the 1000 mW diode lasers 400 is turned off during normal usage. Similarly, green laser set 14 may include 8×500 mW DPSS lasers 450 arranged on one or two boards 430 or 4×1000 mW DPSS lasers 450 arranged on a single board 430, while blue laser set 16 may include 8×500 mW DPSS lasers 450 arranged on one or two boards 430 or 4×1000 mW DPSS lasers 450 arranged on a single board 430.

In one embodiment, each set 12, 14 and 16 comprises from 2 and 40 lasers in total. In another embodiment, from 4 to 20 lasers are employed. The number of extra lasers in each set 12, 14 and 16 may vary according to design. One factor that may influence the number of extra lasers in each set is the desired longevity of display device 10. A designer increases the number of extra lasers in each set 12, 14 and 16 to increase longevity. Known fatigue limits and lifetimes for individual lasers may also affect the number of extra lasers in each set. In one embodiment, a laser set 12, 14 and 16 includes one more laser than the number of lasers needed to produce the desired amount of light. In another embodiment, a laser set 12, 14 and 16 includes 2–8 more lasers than the number of lasers needed to produce the desired amount of light.

Control circuitry 76 determines which of the lasers in a redundant set 12, 14 and 16 produce light. Thus, control circuitry 76 sends on/off commands to circuitry for each laser on board 430 based on stored instructions for the operation of each redundant set. In one embodiment, control circuitry 76 determines which of the lasers in each set 12, 14 and 16 produces light based on the operability of each laser in the sets. As mentioned above, a photodiode chip for each laser monitors output light intensity. Control circuitry 76 uses feedback from each photodiode chip to determine which lasers are operable, and adjusts output on/off commands to lasers in each set 12, 14 and 16 accordingly.

Redundant laser supply is advantageous to prevent failure of an individual laser from compromising output for the entire set, or output for a given primary color. Correspondingly, each laser set 12, 14 and 16 may continue to output its desired and intended luminous power and primary color even though an individual laser in the set is no longer operable. In most cases, this increases display device 10 longevity for a given set of lasers, with only a slight increase in cost and size.

Periodic shutdown for each laser in a redundant set may also be beneficial for heat dissipation. This allows individual lasers to be heated less over the course of extended usage of display device 10, such as usage associated with motion picture video viewing. Shutdown for individual lasers in a set may be cyclical based on a predetermined shutdown scheme. For example, in a four laser redundant scheme where three lasers are needed for desired output power in normal usage, each of the four lasers may take turns shutting down for a predetermined time. This gives each laser periodic time to cool, and results in less heat generation for each laser. Alternately, shutdown may be used to protect an individual laser that is heating to a threshold temperature as sensed by a temperature sensor disposed in proximity to the laser. Logic stored in memory and accessible to control circuitry 76 (FIG. 1) then shuts down the laser (and may turn on fans 24) to prevent the heating laser from reaching the threshold temperature. Multiple threshold temperatures may be established in this manner; and logic may be implemented that determines which lasers in a redundant set are used when multiple lasers in the set reach a particular threshold temperature. Redundant laser supply also advantageously increases longevity for individual lasers that benefit from periodic shut-down, thereby also increasing longevity for display device 10 on a given laser set.

In a specific embodiment, each laser in sets 12, 14 and 16 includes a temperature sensor that detects the temperature of each laser in the set. Control circuitry 76 uses feedback from the temperature sensors to determine a) if any lasers are heating to one or more temperature thresholds, and b) the specific temperature of each diode laser to minimize temperature based wavelength drift. Based on this information and stored instructions for each condition, or multiple conditions, control circuitry 76 determines which of the lasers in the set produce light based on the temperature of each laser in the set. The stored logic may also include instructions for special events, such as when multiple lasers reach a predetermined temperature threshold, or when an individual laser reaches a higher or dangerous temperature threshold.

Some diode lasers 400 include a temperature based frequency drift that alters the wavelength of output laser light with temperature of the laser. Drift of 0.3 nanometers/degree Celsius are common. Typically, a laser manufacturer knows temperature based frequency drift for a given laser. In this case, redundant laser supply may decrease any temperature-based drift by decreasing the average temperature variation for each laser in a redundant set, thereby increasing light consistency and image quality.

Returning back to FIG. 1, display device 10 employs a single optical modulation device 44 and a common light path between laser sets 12, 14 and 16 and the optical modulation device 44 using fiber optic cabling 72. FIG. 4A illustrates a common fiber-optic cabling arrangement 200 in accordance with a specific embodiment of the present invention.

In arrangement 200, light from each laser 400 and 450 in sets 12, 14 and 16 is first transmitted into a fiber-optic cable 202 dedicated to each laser; and subsequently routed and transmitted into a common fiber-optic cable 204. Each laser dedicated fiber-optic cable 202 receives laser light from an individual laser 400 or 450, and transmits the light to junction 206. In one embodiment, each fiber-optic cable 202 attaches directly to an individual laser 400 or 450. For example, each fiber-optic cable 202 may include a fixture with an inner threaded interface that matches a threaded interface disposed on an outside surface of the diode laser 400 housing. Commercially available fiber-optic cables, such as that available from Ocean Optics Inc. of Dunedin, Fla., may come standard with such coupling and alignment fixtures. In some cases, a short focal length normal or GRIN lens is also mounted at the inlet end of each cable 202 to facilitate laser-to-fiber light transition and collimated transfer into cable 202.

Junction 206 permits transmission of light from fiber-optic cables 202 into converging optics 208, and into common fiber-optic cable 204. Converging optics 208 redirect incoming light from each fiber-optic cable 202 into common fiber-optic cable 204, and comprise a converging lens 208*a* that redirects light toward re-collimating lens 208*b*, which collimates and re-directs incoming laser light from converging lens 208a into common optical fiber 204. In a specific embodiment, the inlet end 204a of cable 204 is disposed at a focus of converging lens 208a. Although not shown, junction 206 may also include a rigid structure, such as a suitably dimensioned molded plastic, that holds fiber-optic cables 202 and 204. In addition, junction 206 may comprise an optical adhesive that adheres cables 202 directly to lens 208.

In one embodiment, the outlet end 202b the fiber-optic cables are combined into a larger cable 214 that contains multiple fibers. Multiple fiber cables, such as fiber ribbon-based cables and those that employ multiple fibers located circumferentially within a round tube, are commercially available from a variety of vendors known to those skilled in the art.

In common fiber-optic cabling arrangement 200, common fiber-optic cable 204 sequentially delivers red, green and blue light as received from each upstream color dedicated fiber-optic cable 202, in a timely order as received from cables 202 and determined by laser set 12, 14 and 16 timing via controller 76 (FIG. 1). An outlet end 204b of common fiber-optic cable 204 transmits light to lens 80a, which diverges light received from common fiber-optic cable 204 to increase the flux area of the laser light. Common fiber-optic cable 204 thus sequentially transmits red, green and blue light along a common light path to a single mirror-based optical modulation device 44 as shown in FIG. 1. In one embodiment, the outlet end 204b of common fiber-optic cable 204 includes a diverging lens 212 that increases the area of laser light flux emitted from common fiber-optic cable 204 before incidence on lens 80a. This decreases the optical path distance (and space within display device 10) needed to increase the laser flux area from the size occurring within fiber-optic cable 204 to a sizable for subsequent transmission onto optical modulation device 44. In another embodiment, the outlet end 204b of common fiber-optic cable 204 includes a rectangular shape that matches the aspect ratio of the downstream optical modulation device 44.

Figure 4B:
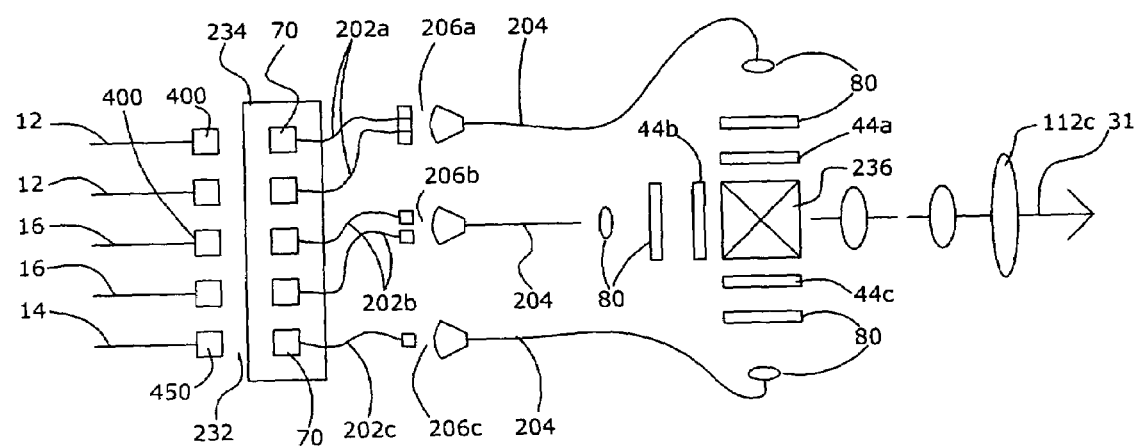
FIG. 4B illustrates a display device in which multiple fiber optic cables transmit light from three laser sets to three light optical modulation devices in accordance with one embodiment of the present invention.

Although the present invention has been described primarily so far with respect to a display device that employs a reflective light modulator of a digital micromirror design in a single light path system, the present invention may also employ other types of light modulators and light path designs. For example, fiber-optic cabling 72 may be arranged for a multiple light path design to transmit light to three primary color dedicated LCD optical modulators, or to three primary color dedicated DMD optical modulators. In the case of an LCD optical modulation device, selective transmission of light comprises selective passage of light through a liquid crystal medium on a pixel by pixel basis. FIG. 4B illustrates a display device 10 in which multiple fiber optic cables 72a–c transmit light from laser sets 12, 14 and 16 to multiple light optical modulation devices 44a–c in accordance with another embodiment of the present invention.

Laser sets 12, 14 and 16 were described above. In this case, output from each laser 400 or 450 is already collimated by optics in the laser, and provided to a fiber-optic interface 70 that is arranged to receive the light with a space 232 between each interface and each laser. The fiber-optic interface 70 for each laser 400 or 450 is held by a fixture 234 that positions and holds each interface 70 to receive the light from its associated laser. Although laser sets 12, 14 and 16 are shown side-by-side with a single fixture 234, is understood that laser sets 12, 14 and 16 may be positioned in different locations in display device 10 and each include their own fixture 234. This may be advantageous to improve space conservation within housing 20, decrease the footprint of housing 20, and minimize display device 10 size.

Light from each laser 400 or 450 in sets 12, 14 and 16 is thus first transmitted into a fiber-optic cable 202 dedicated to each laser. The light is then subsequently routed through a junction 206a–c for each primary color, and transmitted into a common fiber-optic cable 204a–c for each primary color. Junctions 206 and common fiber-optic cables 204 were described above with respect to arrangement 200 in FIG. 4A. In this case however, each common fiber optic cable 202a, 202b, and 202c services a primary color. More specifically, common fiber optic cable 202a transmits red light emitted by red diode laser set 12 to relay optics system 80, fiber optic cable 202b transmits green light emitted by green laser set 14 to optics system 80, and fiber optic cable 202c transmits the light emitted by blue diode laser set 12 to optics system 80. Similar to FIG. 1, optics system 80 converts light receive from fiber-optic cabling 204 to light suitable for transmission onto an optical modulation device 44. In addition, a pair of fly-eye lenses or an integrator tunnel may be disposed along the light path before each optical modulation device 44 to re-distribute light uniformly across the flux transmitted onto optical modulation device 44.

As shown in FIG. 4B, optical modulation devices 44a–c are transmissive type LCD panels that each spatially filter light and provide a color image onto combining optics 236, which emits a composite image towards projection lenses 112 along optical path 31. For the triple path design shown in FIG. 4B, lasers in sets 12, 14 and 16 may be left on continuously to provide continuous laser light to optical modulation devices 44a–c. In this case, control circuitry 76 for display device 10 synchronizes frame and pixel data between each of the optical modulation devices 44a–c. The triple path design shown in FIG. 4B advantageously results in a brighter image than a shared color system that relies on one optical modulation device 44.

Figure 5A:
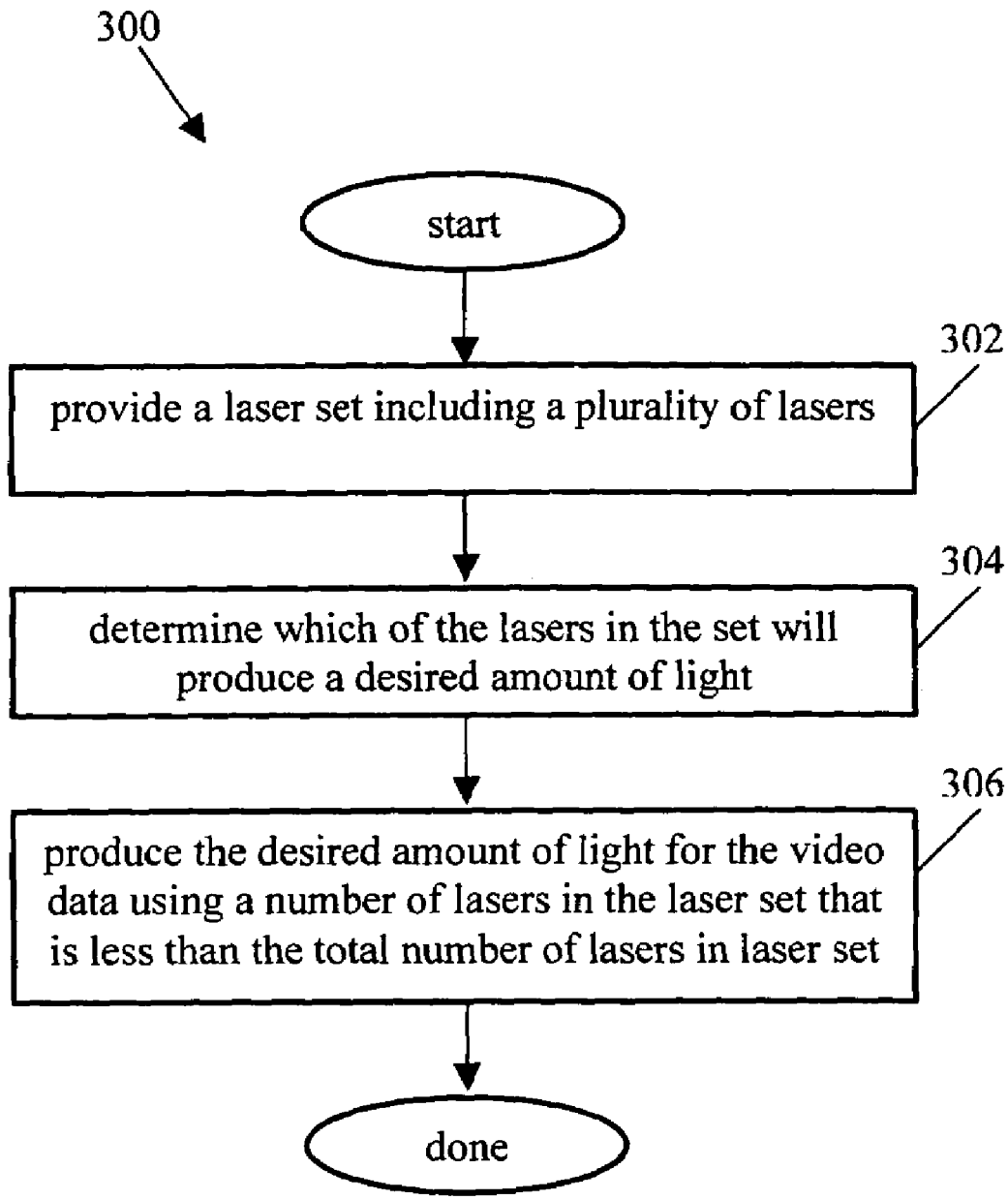
FIG. 5A illustrates a process flow for producing light in a projection-type display device in accordance with one embodiment of the invention.

FIG. 5A illustrates a process flow 300 for producing light in a projection-type display device in accordance with one embodiment of the invention. While the present invention will now be described as a method and separable actions for producing light, those skilled in the art will recognize that the subsequent description may also illustrate systems and components, such as a suitably configured controller and software, capable of performing the method and actions.

Process flow 300 begins by providing a laser set including a plurality of lasers (302). A suitable display device including three lasers sets is described above with respect to FIG. 1. In one embodiment, each laser in the laser set produces light in a wavelength range related to a primary color. For example, a first set is responsible for the generation of red light, a second set responsible for the generation of green light, and a third set responsible for the generation of blue light. In this case, each laser in the first laser set produces light in a wavelength range between about 615 and about 690 nanometers, each laser in the second laser set produces light in a wavelength range between about 510 and about 570 nanometers, and each laser in the third laser set produces light in a wavelength range between about 420 and about 500 nanometers.

Process flow 300 determines which lasers in the set produce a desired amount of light (304). To do so, the control circuitry performs a check to determine if all lasers in the set are operable, and periodically monitors the operability of each laser in a redundant set. Testing each laser and reporting laser response using a photodiode chip arranged to detect light for each laser permits this. Testing may be performed at device start up and at regular intervals, for example. If any lasers are inoperable, they are not called upon by the control circuitry to produce light. If the number of inoperable lasers in the set matches the number of extra lasers in a redundant set, then all operable lasers are used to produce the desired amount of light (without redundant control).

If a redundant set includes more operable lasers in the set than the number needed to produce the desired amount of light, then redundant control proceeds for all operable lasers. In one embodiment, process flow 300 cycles power to lasers in a redundant set according to a regular usage interval. The regular usage interval may vary according to known heat generation and heat dissipation rates of each laser within the display device, the total number of lasers in the set, the number of redundant lasers in the set, an initiation period for laser generation, and the type of laser and its sensitivity to heat, for example. DPSS lasers, in particular, are typically sensitive to heat and may include more redundant lasers in the set that are cycled quicker to avoid heat accumulation in each laser. In one embodiment, power to each laser cycles in turn for a period from about 0.1 second to about 10 minutes. In a specific embodiment, power to each laser in a redundant set cycles in turn for a period from about 1 second to about 1 minute. In another embodiment, process flow 300 selects individual lasers for use according to heat control instructions stored in software that is accessible to the control circuitry (320, FIG. 5C).

Process flow 300 then produces the desired amount of light using a number of lasers in the laser set that is less than the total number of lasers in laser set (306). If lasers in the redundant set are diode lasers, then the control circuitry also regulates the current provided to each laser when turned on. This includes both preventing current greater than a maximum current threshold from reaching each diode laser and maintaining the current above lasing threshold levels for each laser.

Figure 5B:
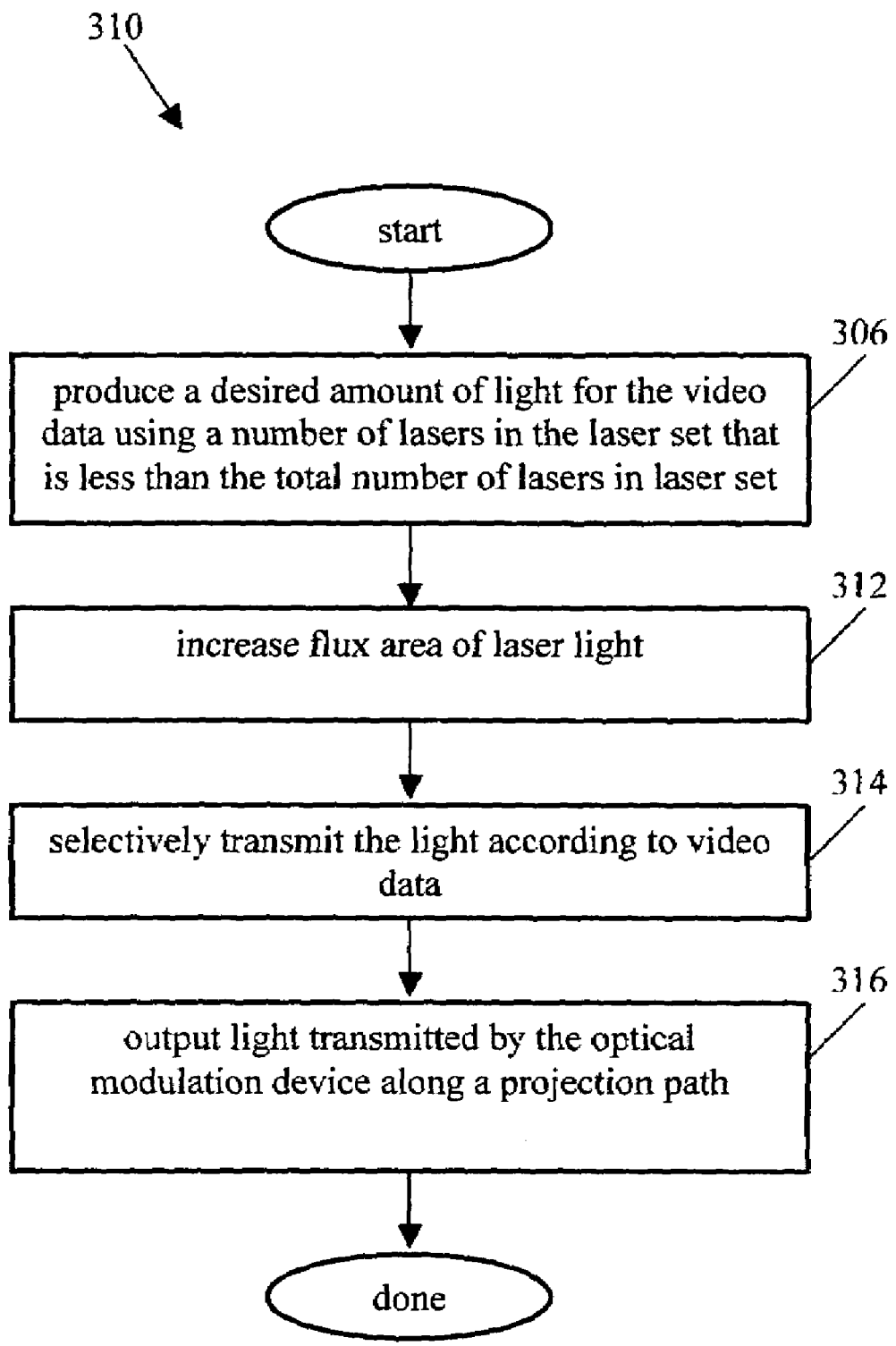
FIG. 5B illustrates a process flow for producing an image using a projection-type display device in accordance with one embodiment of the invention.

FIG. 5B illustrates a process flow 310 for producing an image using a projection-type display device in accordance with one embodiment of the invention. Process flow 310 begins by producing a desired amount of light using a number of lasers in a laser set that is less than the total number of lasers in the laser set (306 of FIG. 5A).

In one embodiment, process flow 310 determines which lasers in the set produce a desired amount of light in response to reception of a video signal. Exemplary devices that may output video data to the display device include desktop computers, laptop computers, personal digital assistants (PDAs), cellular telephones, video game consoles, digital cameras, digital video recorders, DVD players, and VCRs. Video data provided to control circuitry 76 may be in a digital or an analog form. Process flow 310 may also convert an incoming analog video signal to a digital video signals for use in the display device.

The light generated by lasers in the redundant sets is collected and transmitted along one or more optical paths (as illustrated in FIGS. 4A and 4B for example). In one embodiment, fiber-optic cables 72 transmit the light. Relay optics disposed along the optical path increase the flux area of light emitted by the lasers, or transmitted by the fiber-optic cabling, before transmission to an optical modulation device (312). The relay optics may comprise one or more lenses that increase luminous flux size of the laser light to a size suitable for transmission onto an optical modulation device.

The light is then selectively transmitted according to video data included in a video signal provided to an optical modulation device (314). Referring to FIG. 1, which employs a single light path, a digital micromirror "DMD" device 44 and a prism 110, light propagates through prism component 110*a*, reflects off a surface 110*d* at interface 110*c* by total internal reflection, and forms a reflected pre-modulated beam directed towards optical modulation device 44. The reflected pre-modulated beam travels through prism component 110*a* to reach optical modulation device 44, which selectively transmits light according to video data in a signal that corresponds to an image to be projected. Each mirror in optical modulation device 44 reflects light in its 'on' state back into prism component 110*a* and through interface 110*c* without internal reflection such that the light propagates into prism component 110*b* and out an exit face 110*e* of prism 110. Light output through exit face 110*e* is characterized by optical path 31, which propagates through one or more projection lenses 112 that manipulate image light for enlarged display onto a screen or suitable receiving surface (316). Typically, the image is cast with a splay angle such that the image enlarges as the distance to a receiving surface increases.

Frame and color sequential information output by a laser light generation system can be electrically and digitally controlled (the coordination of 306 and 314 in process flow 310). For display devices that employ sequential color provision onto a single optical modulation device such as a DMD, electrical and digital control of laser light generation allows faster and more accurate sequential color synchronization and transmission than mechanical color wheel based systems. This digital control and improved red, green and blue light supply may also lead to reduced flicker and improved light efficiency within the display device. In addition, individual in digital control of each laser also permits computer control of light generation within projection type display device—in contrast to existing binary on-off white light lamp control. As mentioned above, this permits control of redundant laser sets to increase longevity of a laser based light source and display device.

Figure 5C:
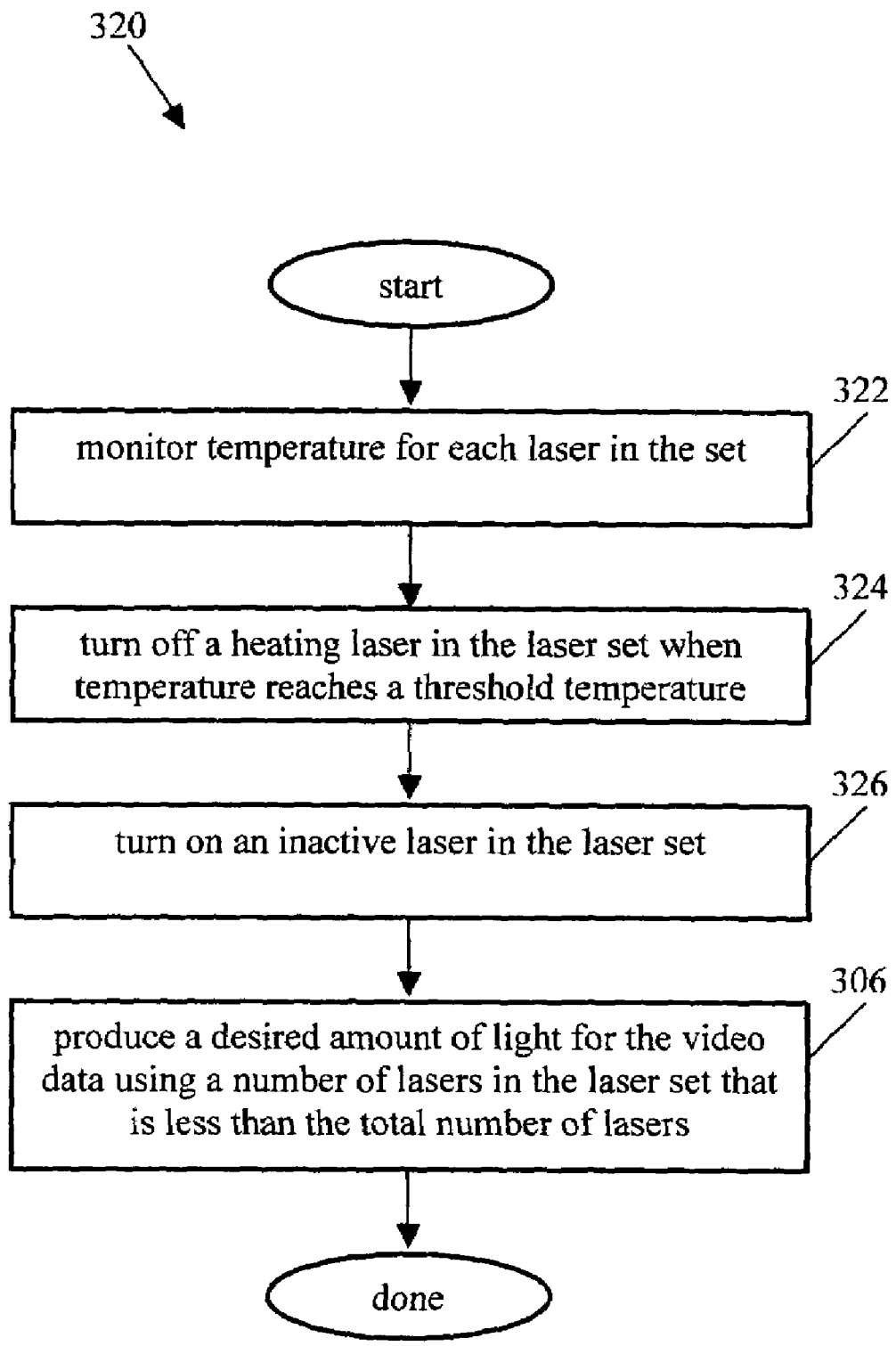
FIG. 5C illustrates a process flow for using a projection-type display device that employs a set of lasers including a plurality of lasers to produce light in accordance with one embodiment of the invention.

FIG. 5C illustrates a process flow 320 for using a projection-type display device that employs a set of lasers including a plurality of lasers to produce light in accordance with one embodiment of the invention. Process flow 320 controls individual lasers in a redundant laser set according to heat control instructions stored in software that is accessible to control that implements circuitry process flow 320.

In this case, the control circuitry monitors temperature for each laser in the set (322). Temperature sensors in proximity to each laser that detect temperature of each laser and provide temperature information to the control circuitry allow this.

Process flow 320 turns off a heating laser in a redundant laser set when temperature for the heating laser reaches a threshold temperature (324). The temperature threshold may be set to a known temperature failure level for a laser, or various fractions thereof useful for managing temperature levels for one or more lasers. When a laser reaches a threshold temperature, control circuitry, according to logic stored in memory and accessible to the control circuitry, then shuts down the laser to prevent the heating laser from heating further. Multiple threshold temperatures may be established in this manner. For example, multiple temperature thresholds may be set according to regular temperature intervals to keep all lasers in a redundant set at relatively equal temperature levels regardless of heat generation or heat dissipation rates for each laser. As described above, lasers in a redundant set may be cycled at regular intervals. In this case, the temperature-based control may take priority in determining which lasers are cycled. Thus, if one laser has reached a threshold temperature above the remainder of the lasers, it may be kept from participation in a cycling scheme until it cools below the threshold temperature.

In response to turning off one laser for heat purposes, process flow 320 turns on an inactive laser in the laser set (326). An inactive laser refers to a laser in a redundant set that is not currently emitting light. Logic may be implemented that determines which lasers in a redundant set are used when multiple lasers in the set reach a particular threshold temperature, such as turning on lasers with the currently lowest operating temperature in place of a heating laser that reaches a new threshold temperature that none others in the set have reached. After turning on the new inactive laser, process flow 320 produces a desired amount of light using a number of lasers in a laser set that is less than the total number of lasers in the laser set (306 of FIG. 5A).

Temperature based redundant control increases longevity for individual lasers that benefit from periodic shutdown and those whose endurance suffers from elevated heat exposure, thereby also increasing longevity for a display device on a given redundant laser set. In addition, redundant laser supply may also decrease any temperature-based drift by decreasing the average temperature variation for each laser in a redundant set, thereby increasing light consistency and image quality.

Laser based systems described herein advantageously provide a light generation option for projection-type display devices that requires low voltage and consumes low power. Diode lasers are more efficient in terms of light generation per input energy, particularly relative to white light lamps. Laser light sources also generate less heat than a white light lamp, thereby easing heat dissipation requirements. This allows for smaller cooling fans that consume less power and require less space. Another advantage of diode lasers is that diode lasers emit relatively monochromatic colored light, thereby eliminating the need for a color wheel and its spatial requirements—and eliminating the color wheel motor which also occupies space, consumes power and generates heat. Cumulatively, these factors each contribute to significantly reduced power consumption for a display device and enable battery-powered projection-type display devices.

Laser based designs described herein are also lighter and require less space than white light lamp sources, which enables projection type display devices that are smaller, less weight, and increasingly portable. In addition, the collimated light output from lasers is significantly smaller in cross-sectional flux area and therefore requires less space for optical manipulation, such as smaller lenses, further saving space and reducing display device size. In one embodiment, display device 10 is less than 4 pounds. As mentioned above, walls of housing 20 may comprise a lightweight and stiff molded plastic or metal that reduces overall weight of display device 10. In another embodiment, display device 10 is less than 2 pounds.

Display devices described herein also benefit from highly collimated and substantially coherent light output. This permits increased depth of focus for a projected image; and permits an increased range of focus. For some display device designs, this may eliminate the need for manual focusing tools and thereby further reduce the size and cost of display device.

With respect to usage, the present invention may receive analog or digital video signals and data from a range of systems and devices. In addition to personal computers such as desktop computers and laptop computers, a variety of other computer systems and digital devices may output video data to a display device of the present invention. Handheld computers, portable digital assistants and portable digital devices are increasingly integrating video functionality, including the ability to communicate with an external display device. Other portable digital devices such as video games, portable video games, portable digital video recorders and digital cameras may also provide video output to display device described herein. One current trend is hybrid entertainment devices that integrate the functionality of computer systems, stereos, and televisions. In addition, set-top boxes associated with cable television services are becoming much more sophisticated user interfaces as interactive services become available to cable customers. Any of these devices may employ and benefit from video output using a display device as claimed herein. The scope of digital computer systems is expanding hurriedly and creating many systems and devices that may employ the present invention. A merging of television, video, and computer functions into a single device also adds value to the present invention since the sensitivity to image quality and size is high in applications such as motion picture viewing. Video game consoles that use large display devices may particularly benefit from the present invention. Moreover, those skilled in the art will appreciate that the invention may be practiced with other computer system configurations, multiprocessor systems, microprocessor-based or programmable consumer electronics, minicomputers, mainframe computers, and the like.

Display devices of the present invention may provide projected images having an image size ranging from inches to many feet, as determined by a user and environment. Image size for a projector typically depends on mechanical factors such as the distance from the projector to the receiving surface and a splay angle for the projection lens system 112 (FIG. 1). Display device 10 is well-suited for display of motion pictures and still photographs onto screens. In addition, display device 10 is also useful for conducting sales demonstrations, playing video games, general computer usage, business meetings, and classroom instruction, for example.

Although the foregoing invention has been described in some detail for purposes of clarity of understanding, those skilled in the art will recognize that various modifications may be made within the scope of the appended claims. For example, although diode lasers described herein have primarily been described with respect to side emitting Fabry-Perot diode laser designs, it is understood that other designs such as vertical cavity surface emitting diode lasers, other vertical emitting and distributed feedback laser designs may be used. In addition, optics may also be employed to alter other unwanted laser beam characteristics not specifically described above. For example, one or more wedge shaped prisms may be used to alter or correct for any elliptical beam shape in a laser beam, if present. By manipulating the relative orientations of the prisms, the prisms may be used to shape or extend the beam profile in one more directions. Further, although the present invention has been described with respect to fiber-optic cabling for transmission of light between lasers in sets 12, 14 and 16 and relay optics that deliver the light to the optical modulation device, it is understood that fiber-optic cabling is not necessary for the present invention. In one embodiment, lasers in sets 12, 14 and 16 are arranged to emit light towards optics system 80, which converts incoming light to a light flux suitable for transmission onto optical modulation device 44 and transmits the light to an optical modulation device 44 without the use of fiber-optic cabling. For example, the lasers may be arranged to emit light towards a first lens that spans the laser light from each laser onto a first fly-eye lens. The invention is, therefore, not limited to the specific features and embodiments described herein and claimed in any of its forms or modifications within the scope of the appended claims.

What is claimed is:

1. A projection-type display device, comprising:
    a first diode laser set, each diode laser in the first diode laser set including a) a lasing medium in a lasing chamber for producing first light including a first wavelength between about 400 nanometers and about 700 nanometers, b) an output lens for emitting the first light, and c) a photosensor that detects the first light and outputs a signal indicative of the first light;
    a second diode laser set, each diode laser in the second diode laser set including a) a lasing medium in a lasing chamber for producing second light including a second wavelength between about 400 nanometers and about 700 nanometers, and b) an output lens for emitting the second light;
    at least one optical modulation device configured to selectively transmit the first light and the second light according to video data included in a video signal provided to the at least one optical modulation device;
    an optics system arranged to receive the first light and the second light before receipt by the at least one optical modulation device and configured to increase flux area for the first light and the second light before receipt by the at least one optical modulation device; and
    a projection lens system configured to project light transmitted by the at least one optical modulation device along a projection path.

2. The projection-type display device of claim 1 further comprising current control circuitry configured to regulate current provided to each diode laser in the first diode laser set.

3. The projection-type display device of claim 2 wherein the current control circuitry is configured to maintain current provided to each diode laser in the first diode laser set above a lasing threshold.

4. The projection-type display device of claim 2 wherein the current control circuitry is configured to prevent current greater than a maximum current threshold from reaching each diode laser in the first diode laser set.

5. The display device of claim 1 wherein to output lens for each diode laser in the first diode laser set reduces divergence in at least one direction for the first laser light.

6. The projection-type display device of claim 5 wherein the output lens for each diode laser in the first diode laser set reduces astigmatism in the first laser light.

7. The projection-type display device of claim 1 further comprising at least one fiber optic cable having a first end configured to receive light from the first diode laser set and a second end configured to outlet the first laser light to the optics system.

8. The projection-type display device of claim 1 wherein the first diode laser set comprises from about 1 to about 40 diode lasers.

9. The projection-type display device of claim 1 wherein the first wavelength is between about 615 and about 690 nanometers.

10. The projection-type display device of claim 9 wherein the first wavelength is between about 625 and about 645 nanometers.

11. The projection-type display device of claim 1 wherein the second wavelength is between about 420 and about 500 nanometers.

12. The projection-type display device of claim 11 wherein the second wavelength is between about 430 and about 460 nanometers.

13. The projection-type display device of claim 1 further comprising a third set of lasers, each laser in the third laser set including a) a lasing medium and lasing chamber for producing third light including a third wavelength between about 400 nanometers and about 700 nanometers, and b) an output lens for emitting the third light.

14. The projection-type display device of claim 13 wherein each laser in the third laser set is a diode pumped solid state laser including a multiplication crystal in the lasing chamber for producing third light including a third wavelength between about 510 nanometers and about 570 nanometers.

15. The projection-type display device of claim 14 wherein the third wavelength is between about 530 and about 550 nanometers.

16. The projection-type display device of claim 1 wherein the at least one optical modulation device comprises three optical modulation devices that are each configured to selective transmission of a primary color.

17. The projection-type display device of claim 1 wherein the at least one optical modulation device comprises a single optical modulation device configured to selectively transmits the first light and the second light.

18. A projection-type display device, comprising:
    a red diode laser set, each red diode laser in the red diode laser set including a) a lasing medium in a lasing chamber for producing light including a red wavelength between about 615 nanometers and about 690 nanometers, b) an output lens for emitting the red light, and c) a photosensor that detects the red light and outputs a signal indicative of the red light;
    a blue diode laser set, each blue diode laser in the blue diode laser set including a) a lasing medium in a lasing chamber for producing light including a blue wavelength between about 420 nanometers and about 500 nanometers, and b) an output lens for emitting the blue light;
    at least one optical modulation device configured to selectively transmit light including the red wavelength and the light including the blue wavelength according to video data included in a video signal provided to the at least one optical modulation device;
    an optics system, arranged to receive the light including the red wavelength and the light including the blue wavelength before receipt by the at least one optical modulation device, configured to increase flux area for the light including the red wavelength and the light including the blue wavelength before receipt by the at least one optical modulation device; and
    a projection lens system configured to project light transmitted by the at least one optical modulation device along a projection path.

19. A projection-type display device, comprising:
    a red diode laser set, each red diode laser in the red diode laser set including a) a lasing medium in a lasing chamber for producing light including a red wavelength between about 615 nanometers and about 690 nanometers, b) an output lens for emitting the red light, and c) a photosensor that detects the red light and outputs a signal indicative of the red light;

a blue diode laser set, each blue diode laser in the blue diode laser set including a) a lasing medium in a lasing chamber for producing light including a blue wavelength between about 420 nanometers and about 500 nanometers, and b) an output lens for emitting the blue light;

a third set of lasers, each laser in the third laser set including a) a lasing medium and lasing chamber for producing third light including a third wavelength between about 510 nanometers and about 570 nanometers, and b) an output lens for emitting the third light;

at least one optical modulation device configured to selectively transmit light including the red wavelength and the light including the blue wavelength according to video data included in a video signal provided to the at least one optical modulation device;

an optics system, arranged to receive light before receipt by the at least one optical modulation device, configured to increase flux area for the light before receipt by the at least one optical modulation device; and a projection lens system configured to project light transmitted by the at least one optical modulation device along a projection path.

* * * * *